US008600531B2

(12) United States Patent
Topchy et al.

(10) Patent No.: US 8,600,531 B2
(45) Date of Patent: Dec. 3, 2013

(54) METHODS AND APPARATUS FOR GENERATING SIGNATURES

(75) Inventors: Alexander Pavlovich Topchy, New Port Richey, FL (US); Arun Ramaswamy, Tampa, FL (US); Venugopal Srinivasan, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 934 days.

(21) Appl. No.: 12/266,380

(22) Filed: Nov. 6, 2008

(65) Prior Publication Data
US 2009/0225994 A1 Sep. 10, 2009

Related U.S. Application Data

(60) Provisional application No. 61/033,992, filed on Mar. 5, 2008.

(51) Int. Cl.
*G06F 17/00* (2006.01)
*H04R 29/00* (2006.01)

(52) U.S. Cl.
USPC .............................................. 700/94; 381/56

(58) Field of Classification Search
USPC .............................................. 700/94; 381/56
See application file for complete search history.

(56) References Cited

U.S. PATENT DOCUMENTS

| 2,605,361 | A | | 7/1952 | Cutler et al. |
|---|---|---|---|---|
| 3,845,391 | A | | 10/1974 | Crosby |
| 3,919,479 | A | | 11/1975 | Moon et al. |
| 4,025,851 | A | | 5/1977 | Haselwood et al. |
| 4,053,710 | A | | 10/1977 | Advani et al. |
| 4,214,125 | A | | 7/1980 | Mozer et al. |
| 4,230,990 | A | | 10/1980 | Lert, Jr. et al. |
| 4,282,403 | A | | 8/1981 | Sakoe |
| 4,432,096 | A | * | 2/1984 | Bunge .......................... 704/206 |
| 4,450,531 | A | | 5/1984 | Kenyon et al. |
| 4,520,830 | A | | 6/1985 | Flanagan, III |

(Continued)

FOREIGN PATENT DOCUMENTS

| AU | 678163 | 11/1993 |
|---|---|---|
| AU | 718227 | 11/1997 |

(Continued)

OTHER PUBLICATIONS

International Bureau, International Preliminary Report on Patentability for PCT/US2008/061783, Nov. 3, 2009, 8 pages.

(Continued)

*Primary Examiner* — Jesse Elbin
(74) *Attorney, Agent, or Firm* — Hanley, Flight & Zimmerman, LLC

(57) ABSTRACT

Signaturing methods and apparatus as described. In one example, a signaturing method includes capturing an audio signal, applying a first window function to a portion of the captured audio signal to produce a first windowed audio block, applying a second window function to the portion of the captured audio signal to produce a second windowed audio block, determining a first characteristic of a band of frequencies in the first windowed audio block, determining a second characteristic of the band of frequencies in the second windowed audio block, comparing the first characteristic to the second characteristic, and assigning a signature bit representative of the portion of the captured audio signal based on the comparison of the first characteristic and the second characteristic. Other examples are described.

30 Claims, 14 Drawing Sheets

(56) References Cited

U.S. PATENT DOCUMENTS

| | | | |
|---|---|---|---|
| 4,533,926 A | 8/1985 | Foldvari et al. |
| 4,547,804 A | 10/1985 | Greenberg |
| 4,624,009 A | 11/1986 | Glenn et al. |
| 4,639,779 A | 1/1987 | Greenberg |
| 4,672,361 A | 6/1987 | Kokubo et al. |
| 4,677,466 A | 6/1987 | Lert, Jr. et al. |
| 4,697,209 A | 9/1987 | Kiewit et al. |
| 4,703,476 A | 10/1987 | Howard |
| 4,739,398 A | 4/1988 | Thomas et al. |
| 4,783,660 A | 11/1988 | Pierce |
| 4,805,020 A | 2/1989 | Greenberg |
| 4,834,724 A | 5/1989 | Geiss et al. |
| 4,843,562 A | 6/1989 | Kenyon et al. |
| 4,931,871 A | 6/1990 | Kramer |
| 4,945,412 A | 7/1990 | Kramer |
| 4,947,436 A | 8/1990 | Greaves et al. |
| 4,967,273 A | 10/1990 | Greenberg |
| 5,023,929 A | 6/1991 | Call |
| 5,113,437 A | 5/1992 | Best et al. |
| 5,121,428 A | 6/1992 | Uchiyama et al. |
| 5,210,820 A | 5/1993 | Kenyon |
| 5,319,735 A | 6/1994 | Preuss et al. |
| 5,436,653 A | 7/1995 | Ellis et al. |
| 5,437,050 A | 7/1995 | Lamb et al. |
| 5,450,490 A | 9/1995 | Jensen et al. |
| 5,504,518 A | 4/1996 | Ellis et al. |
| 5,563,942 A | 10/1996 | Tulai |
| 5,572,246 A | 11/1996 | Ellis et al. |
| 5,579,124 A | 11/1996 | Aijala et al. |
| 5,581,800 A | 12/1996 | Fardeau et al. |
| 5,612,729 A | 3/1997 | Ellis et al. |
| 5,621,454 A | 4/1997 | Ellis et al. |
| 5,629,739 A | 5/1997 | Dougherty |
| 5,650,943 A | 7/1997 | Powell et al. |
| 5,687,191 A | 11/1997 | Lee et al. |
| 5,764,763 A | 6/1998 | Jensen et al. |
| 5,792,053 A | 8/1998 | Skladnev et al. |
| 5,822,360 A | 10/1998 | Lee et al. |
| 5,941,822 A | 8/1999 | Skladnev et al. |
| 6,002,443 A | 12/1999 | Iggulden |
| 6,026,323 A | 2/2000 | Skladnev et al. |
| 6,061,793 A | 5/2000 | Tewfik et al. |
| 6,151,578 A | 11/2000 | Bourcet et al. |
| 6,167,400 A * | 12/2000 | Brandin ........................ 707/758 |
| 6,170,060 B1 | 1/2001 | Mott et al. |
| 6,205,249 B1 | 3/2001 | Moskowitz |
| 6,272,176 B1 | 8/2001 | Srinivasan |
| 6,286,005 B1 | 9/2001 | Cannon |
| 6,317,703 B1 | 11/2001 | Linsker |
| 6,421,445 B1 | 7/2002 | Jensen et al. |
| 6,442,283 B1 | 8/2002 | Tewfik et al. |
| 6,469,749 B1 | 10/2002 | Dimitrova et al. |
| 6,604,072 B2 | 8/2003 | Pitman et al. |
| 6,711,540 B1 | 3/2004 | Bartkowiak |
| 6,751,337 B2 | 6/2004 | Tewfik et al. |
| 6,871,180 B1 | 3/2005 | Neuhauser et al. |
| 6,968,564 B1 | 11/2005 | Srinivasan |
| 6,971,010 B1 | 11/2005 | Abdel-Mottaleb |
| 6,996,237 B2 | 2/2006 | Jensen et al. |
| 7,006,555 B1 | 2/2006 | Srinivasan |
| 7,013,468 B2 | 3/2006 | Abercrombie et al. |
| 7,058,223 B2 | 6/2006 | Cox |
| 7,171,016 B1 | 1/2007 | Rhoads |
| 7,194,752 B1 | 3/2007 | Kenyon et al. |
| 7,289,643 B2 | 10/2007 | Brunk et al. |
| 7,302,574 B2 | 11/2007 | Conwell et al. |
| 7,316,025 B1 | 1/2008 | Aijala et al. |
| 7,328,153 B2 | 2/2008 | Wells et al. |
| 7,343,492 B2 | 3/2008 | Moskowitz et al. |
| 7,698,008 B2 * | 4/2010 | Steinberg ........................ 700/94 |
| 7,712,114 B2 | 5/2010 | Ramaswamy |
| 7,783,889 B2 | 8/2010 | Srinivasan |
| 7,921,296 B2 | 4/2011 | Haitsma et al. |
| 8,364,491 B2 | 1/2013 | Topchy et al. |
| 8,369,972 B2 | 2/2013 | Topchy et al. |
| 2001/0051996 A1 | 12/2001 | Cooper et al. |
| 2002/0082731 A1 | 6/2002 | Pitman et al. |
| 2002/0082837 A1 | 6/2002 | Pitman et al. |
| 2002/0126872 A1 | 9/2002 | Brunk et al. |
| 2003/0005430 A1 | 1/2003 | Kolessar |
| 2003/0054757 A1 | 3/2003 | Kolessar et al. |
| 2003/0131350 A1 | 7/2003 | Peiffer et al. |
| 2003/0179909 A1 | 9/2003 | Wong et al. |
| 2004/0122679 A1 | 6/2004 | Neuhauser et al. |
| 2004/0170381 A1 | 9/2004 | Srinivasan |
| 2004/0181799 A1 | 9/2004 | Lu et al. |
| 2005/0025334 A1 | 2/2005 | Tewfik et al. |
| 2005/0035857 A1 | 2/2005 | Zhang et al. |
| 2005/0043830 A1 | 2/2005 | Lee et al. |
| 2005/0200476 A1 | 9/2005 | Forr et al. |
| 2005/0203798 A1 | 9/2005 | Jensen et al. |
| 2005/0216509 A1 | 9/2005 | Kolessar et al. |
| 2005/0232411 A1 | 10/2005 | Srinivasan et al. |
| 2005/0243784 A1 | 11/2005 | Fitzgerald et al. |
| 2005/0268798 A1 | 12/2005 | Neuhauser et al. |
| 2005/0272015 A1 | 12/2005 | Jensen et al. |
| 2005/0272017 A1 | 12/2005 | Neuhauser et al. |
| 2006/0020958 A1 | 1/2006 | Allamanche et al. |
| 2006/0028953 A1 | 2/2006 | Jensen et al. |
| 2006/0075237 A1 | 4/2006 | Seo et al. |
| 2006/0120536 A1 | 6/2006 | Kemp |
| 2006/0195886 A1 | 8/2006 | Ashley |
| 2006/0239503 A1 | 10/2006 | Petrovic et al. |
| 2007/0005118 A1 | 1/2007 | Carter et al. |
| 2007/0199013 A1 | 8/2007 | Samari et al. |
| 2007/0274537 A1 | 11/2007 | Srinivasan |
| 2007/0286451 A1 | 12/2007 | Rhoads |
| 2007/0300066 A1 | 12/2007 | Srinivasan |
| 2008/0276265 A1 | 11/2008 | Topchy et al. |
| 2009/0132074 A1 | 5/2009 | Yamada |
| 2009/0225994 A1 | 9/2009 | Topchy et al. |
| 2011/0022638 A1 * | 1/2011 | Jiang ........................ 707/797 |

FOREIGN PATENT DOCUMENTS

| | | |
|---|---|---|
| AU | 747044 | 9/2000 |
| AU | 2006203639 | 9/2006 |
| CA | 2041754 | 11/1991 |
| CA | 2504552 | 11/1993 |
| CA | 2628654 | 11/1993 |
| CA | 2136054 | 5/1996 |
| CA | 2134748 | 7/2005 |
| CN | 1461565 | 12/2003 |
| CN | 102982810 | 3/2013 |
| DE | 69334130 | 12/2007 |
| DK | 1261155 | 8/2007 |
| EP | 0210609 | 4/1985 |
| EP | 0239809 | 7/1987 |
| EP | 0245037 B1 | 11/1987 |
| EP | 0385799 | 9/1990 |
| EP | 0598682 | 5/1994 |
| EP | 0748563 A1 | 12/1996 |
| EP | 0887958 | 12/1998 |
| EP | 0887958 A1 | 12/1998 |
| EP | 1261155 A2 | 11/2002 |
| EP | 0748563 B1 | 1/2003 |
| EP | 0887958 B1 | 1/2003 |
| EP | 1261155 A3 | 9/2003 |
| EP | 1261155 B1 | 3/2007 |
| ES | 2284777 | 11/2007 |
| FR | 2559002 | 8/1985 |
| GB | 1456103 | 11/1976 |
| GB | 2460773 | 12/2009 |
| JP | 8500471 | 1/1996 |
| JP | 2003-512779 | 4/2003 |
| JP | 2004-519015 | 6/2004 |
| PT | 1261155 | 7/2007 |
| WO | 8810540 | 12/1988 |
| WO | 9322875 | 11/1993 |
| WO | 9411989 | 5/1994 |
| WO | 9841140 | 9/1998 |
| WO | 0019699 | 4/2000 |
| WO | 0035345 | 6/2000 |
| WO | 0079709 | 12/2000 |

(56) References Cited

FOREIGN PATENT DOCUMENTS

| WO | 02065782 | 8/2002 |
|---|---|---|
| WO | WO02065782 | 8/2002 |
| WO | 03009277 | 1/2003 |
| WO | WO03009277 | 1/2003 |
| WO | 03057605 | 7/2003 |
| WO | 2006023770 | 3/2006 |
| WO | 2007066450 | 6/2007 |

OTHER PUBLICATIONS

Intellectual Property Office, GB Examination Report for Aplicaiton No. GB0915239.8, Sep. 18, 2009, 1 page.
European Patent Office, Office Communication issued for EP Application No. 08747030.8, dated Jan. 5, 2010, 3 pages.
Chinese Patent Office, "First Office Action", issued in connection with Chinese Patent Application No. 200880128616.X, Jan. 4, 2012, (6 pages).
Sukittanon, "Modulation-Scale Analysis for Content Identification," IEEE Transactions on Signal Processing, vol. 52, No. 10, Oct. 2004 (13 pages).
International Searching Authority, International Search Report for International application No. PCT/US2008/054434, Feb. 25, 2009, (4 pages).
International Searching Authority, Written Opinion for International application No. PCT/US2008/054434, Feb. 25, 2009, (9 pages).
International Searching Authority, International Search Report for PCT/US2008/082657, Apr. 7, 2009, 4 pages.
International Searching Authority, Written Opinion for PCT/US2008/082657, Apr. 7, 2009, 7 pages.
Haitsma et al., "Robust Audio Hashing for Content Identification, Philips Research," philips.com, 2001, 8 pages.
International Preliminary Report on Patentability, issued in connection with International Patent Application No. PCT/US2008/054434, issued Aug. 26, 2009, mailed Sep. 3, 2009, 10 pages.
International Preliminary Report on Patentability for PCT Application Serial No. PCT/US2008/082657, 7 pages mailed: Sep. 7, 2010.
The State Intellectual Property Office of China, Office Action issued in connection with Chinese Application No. 2008/80012844.0, issued on Sep. 2, 2010 (12 pages).
Canadian Intellectual Property Office, "Office action", issued in connection with Canadian Patent Application No. 2,717,723, Mar. 28, 2012, (3 pages).
International Bureau, "International Preliminary Report on Patentability," issued in connection with International Application No. PCT/US2008/061783, Nov. 3, 2009, (8 pages).
International Bureau, "International Search Report", issued in connection with International Application No. PCT/US2008/082657, Apr. 7, 2009, (4 pages).
Crochiere et al. "Real-Time Speech Coding" Apr. 1982, (14 pages).
David John Bull, Curriculum Vitae of David John Bull, shown and sworn on Dec. 23, 2005 (6 pages).
Dr. Khok Khee Pang, Curriculum Vitae of Dr. Khok Khee Pang, shown and sworn on Mar. 27, 2006, (15 pages).
International Bureau, "Written Opinion," issued in connection with International Application No. PCT/US2008/061783, Jan. 29, 2009 (7 pages).
International Bureau, "Written Opinion", issued in connection with International Application No. PCT/US2008/082657, Apr. 7, 2009, (7 pages).
Haitsma et al., "A Highly Robust Audio Fingerprinting System", 2002, (9 pages).
John Fredrick Arnold, Curriculum Vitae of John Fredrick Arnold, shown and sworn on Jun. 7, 2006, (39 pages).
International Searching Authority, International Search Report for application No. PCT/US2008/061783, Jan. 29, 2009, (4 pages).
United Kingdom Radio Academy, Techcon Conference, http://www.ibs.org.uk/public/lineuparchive/2003/Aug-Sep/TECHCON_2003.pdf, 2 pages, Jul. 2003.
Wai-Kai Chen, The Circuits and Filters Handbook, p. 137, 149, 157, 163, 721, and 2696. 1995, CRC Press.

Doets, P.J.O., & Lagendijk, R.L., "Theoretical Modeling of a Robust Audio Fingerprinting System", Delft University of Technology, Proceedings of SPS 2004, (4 pages).
European Patent Office, "Examination Report", issued in connection with European patent application No. 08873178.1, Apr. 24, 2012, (3 pages).
Australian Government, "Notice of Acceptance", issued in connection with Australian patent application No. 2008218716, Apr. 30, 2012, (3 pages).
Australian Patent Office, "Patent Abridgement," issued in connection with Australian Application No. 42260/93, Document No. AU-B-42260193, (144 pages), Accepted as of May 22, 1997.
European Patent Office, "Appeal File History," issued in connection with European Application No. 02076018.7-2223/1261155, Appeal No. T1118/10-3503, on Aug. 13, 2010, (518 pages).
European Patent Office, "Complete File History," issued in connection with European Application No. 02076018.7-2223/1261155, Appeal No. T1118/10-3503, on Aug. 13, 2010, (1732 pages).
European Patent Office, "Interlocutory Decision at Opposition," issued in connection with European Application No. 02076018.7-2223/1261155, Appeal No. T1118/10-3503, on Mar. 16, 2010, (14 pages).
European Patent Office, "Letter of Patent Proprietor" issued in connection with European Application No. 02076018.7-2223/1261155, Appeal No. T1118/10-3503, written on Dec. 16, 2010, (2 pages).
European Patent Office, "Notice of Deadline for Telecontrol Response" issued in connection with European Application No. 02076018.7-2223/1261155, Appeal No. T1118/10-3503, on Aug. 13, 2010, (4 pages).
European Patent Office, "Notification of Grant" issued in connection with Great Britain Patent Application Serial No. GB0915239.8, mailed on Sep. 28, 2010 (2 pages).
European Patent Office, "Opposition File History," issued in connection with European Application No. 02076018.7-2223/1261155, Appeal No. T1118/10-3503, on Mar. 16, 2010, (546 pages).
European Patent Office, "Summons to Attend Oral Proceedings" issued in connection with European Application No. 02076018.7-2223/1261155, Appeal No. T1118/10-3503, on Jul. 10, 2009, (4 pages).
European Patent Office, "Supplemental European Search Report," issued in connection with European Application No. 93910942, Oct. 31, 1996, (27 pages).
European Patent Office, "Telecontrol Request for Opposition" issued in connection with European Application No. 02076018.7-2223/1261155, Appeal No. T1118/10-3503, on Dec. 24, 2007, (46 pages).
Lieck, Hans-Peter, "Arbitron Filing Prior to Oral Proceedings," Boeters & Lieck European Patent and Trademark Attorneys, written in connection with European Application No. 02076018.7-2223/1261155, Appeal No. T1118/10-3503, Dec. 30, 2009, (18 pages).
Lieck, Hans-Peter, "Arbitron Response to Opposition," Boeters & Lieck European Patent and Trademark Attorneys, written in connection with European Application No. 02076018.7-2223/1261155, Appeal No. T1118/10-3503, Nov. 17, 2008, (18 pages).
Markus, Alexander, "Letter Relating to Appeal Procedure," Berne Patent Attorneys, written in connection with European Application No. 02076018.7-2223/1261155, Appeal No. T1118/10-3503, Dec. 17, 2010, (23 pages).
Storzbach, Michael, "Telecontrol Response," Ammann Patent Attorneys Limited, Berne, written in connection with European Application No. 02076018.7-2223/1261155, Appeal No. T1118/10-3503, Feb. 18, 2009, (8 pages).
Tucker, Nigel Paul, "Arbitron Appeal," Boult Wade Tennant Patent Attorneys, written in connection with European Application No. 02076018.7-2223/1261155, Appeal No. T1118/10-3503, Jul. 26, 2010, (35 pages).
Tucker, Nigel Paul, "Letter Relating to Appeal Procedure," Boult Wade Tennant Patent Attorneys, written in connection with European Application No. 02076018.7-2223/1261155, Appeal No. T1118/10-3503, Dec. 22, 2010, (13 pages).
Chinese Patent Office, "First Office Action", issued in connection with Chinese Patent Application No. 2008800128440, Sep. 2, 2010, (4 pages).

(56) References Cited

OTHER PUBLICATIONS

Chinese Patent Office, "Second Office Action", issued in connection with Chinese Patent Application No. 2008800128440, Jan. 11, 2012, (1 pages).

Chinese Patent Office, "First Office action," issued in connection with Chinese Patent Application No. 200880120098.7, Aug. 29, 2011 (9 pages).

Japanese Patent Office, "Notice of Allowance", issued in connection with JP patent application No. 2010-549634, mailed Apr. 9, 2013 (5 pages).

Japanese Patent Office, "Notice of Grounds for Rejection." Mailed Dec. 4, 2012. (4 pages).

European Patent Office, "Examination Report", issued in connection with European patent application No. 08747030.8, Sep. 10, 2012, (8 pages).

Blaser, Stefan, "Telecontrol Submission Listing Further Art," AMMANN Patent Attorneys Limited, Berne, written in connection with European Application No. 02076018.7-2223/1261155, Appeal No. T1118/10-3503, Feb. 18, 2009, (21 pages).

Differential Pulse-Code Modulation. Wikipedia.org. Revision as of 02:29, Jul. 7, 2010. <http://en.wikipedia.org/w/index.php?title=Differential_pulse-code_modulation&oldid=372141921> (3 pages).

European Patent Office, "Summons to Attend Oral Proceeding Pursuant to Rule 115(1)EPC", issued in connection with application No. 08873178.1-1908/2263335 on Aug. 1, 2013, 7 pages.

* cited by examiner

METHODS AND APPARATUS FOR GENERATING SIGNATURES

CROSS REFERENCE TO RELATED APPLICATIONS

This application claims the benefit of U.S. Provisional Application 61/033,992, filed Mar. 5, 2008, which is incorporated herein by reference in its entirety.

FIELD OF THE DISCLOSURE

The present disclosure relates generally to media monitoring, multimedia content search and retrieval and, more particularly, to methods and apparatus for generating signatures for use in identifying media information.

BACKGROUND

Identifying media information and, more specifically, audio signals (e.g., information in audio streams) using signature matching techniques is well established. Signatures are also equivalently known, and frequently referred to, as fingerprints. Signature matching techniques are often used in television and radio audience metering applications and are implemented using several methods for generating and matching signatures. For example, in television audience metering applications, signatures are generated at monitoring sites (e.g., monitored households) and reference sites. Monitoring sites typically include locations such as, for example, households where the media consumption of audience members is monitored. For example, at a monitoring site, monitored signatures may be generated based on audio streams associated with a selected channel, radio station, etc. The monitored signatures may then be sent to a central data collection facility for analysis. At a reference site, signatures, typically referred to as reference signatures, are generated based on known programs that are provided within a broadcast region. The reference signatures may be stored at the reference site and/or a central data collection facility and compared with monitored signatures generated at monitoring sites. A monitored signature may be found to match with a reference signature and the known program corresponding to the matching reference signature may be identified as the program that was presented at the monitoring site.

DETAILED DESCRIPTION

Figure 1A:
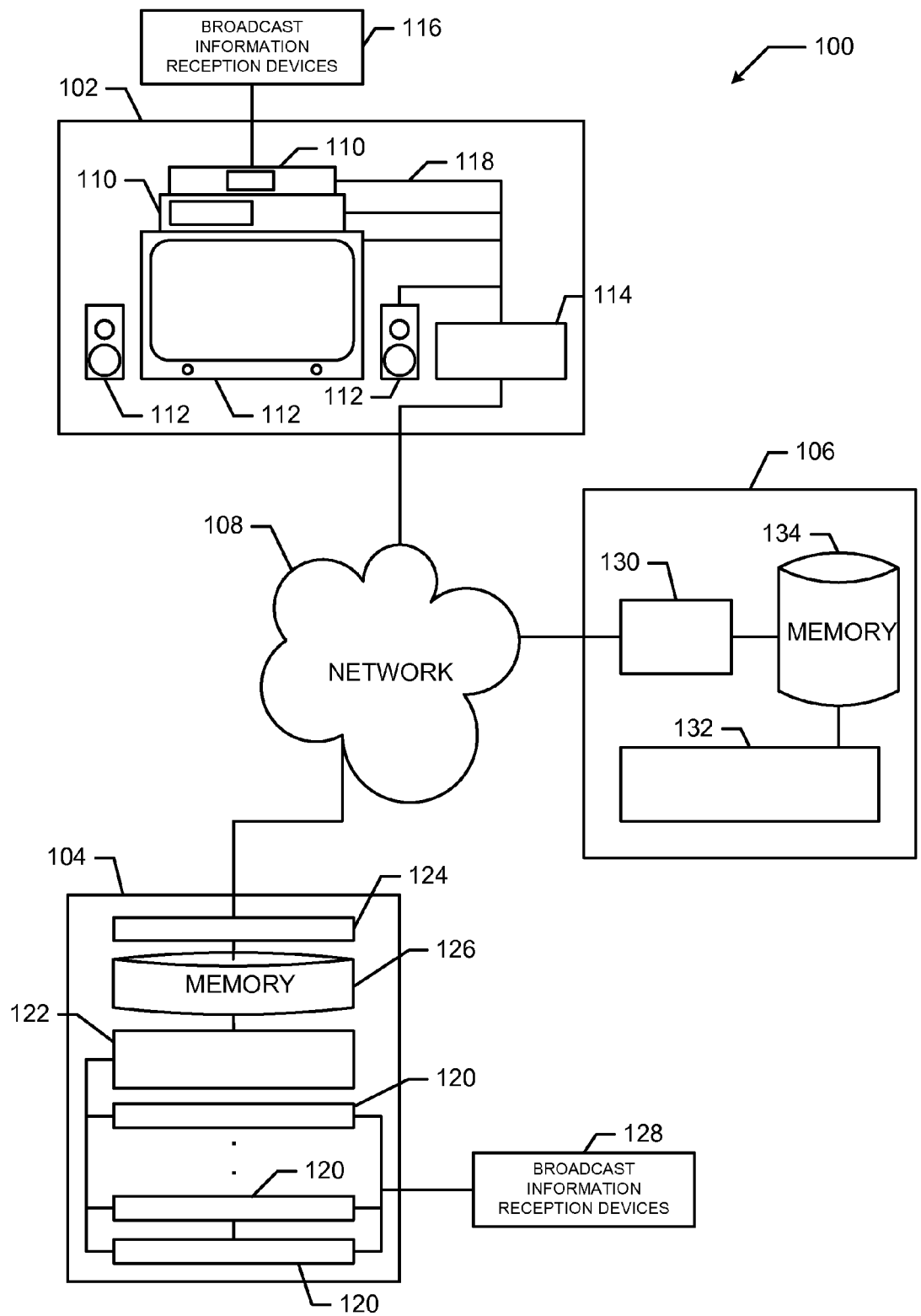
FIGS. 1A and 1B illustrate example audio stream identification systems for generating signatures and identifying audio streams.

Although the following discloses example systems implemented using, among other components, software executed on hardware, it should be noted that such systems are merely illustrative and should not be considered as limiting. For example, it is contemplated that any or all of these hardware and software components could be embodied exclusively in hardware, exclusively in software, or in any combination of hardware and software. Accordingly, while the following describes example systems, persons of ordinary skill in the art will readily appreciate that the examples provided are not the only way to implement such systems.

The methods and apparatus described herein generally relate to generating digital signatures that may be used to identify media information. A digital signature, or digital fingerprint, is a signal descriptor that accurately characterizes signals for the purpose of matching, indexing, or database search and retrieval. In particular, the disclosed methods and apparatus are described with respect to generating digital audio signatures based on audio streams or audio blocks (e.g., audio information). However, the methods and apparatus described herein may also be used to generate digital signatures based on any other type of signals, time series data, and media information such as, for example, video information, web pages, still images, computer data, etc. Further, the media information may be associated with broadcast information (e.g., television information, radio information, etc.), information reproduced from any storage medium (e.g., compact discs (CD), digital versatile discs (DVD), etc.), or any other information that is associated with an audio stream, a video stream, or any other media information for which the digital signatures are generated. In one particular example, the audio streams are identified based on digital signatures including monitored digital signatures generated at a monitoring site (e.g., a monitored household) and reference digital signatures generated and/or stored at a reference site and/or a central data collection facility.

As described in detail below, the methods and apparatus described herein identify media information, including audio streams or any other media, based on digital signatures. The example techniques described herein compute a signature at a particular time using, for example, a single audio block of audio samples, but processes the audio block using two or more windowing functions to result in two or more windowed audio blocks. Further processing of the windowed audio blocks allows detection of the windowing effects on the audio spectrum of the audio block. The signature values unique or substantially unique to the audio block are derived from the effects of the two or more windowing functions on the audio block. That is, the example techniques described herein enable computation or determination of audio signatures without the use of time displaced audio blocks. Of course, the selection of the windowing functions may be adjusted, as may be the type of transformations, their parameters, and/or resolutions used to determine signatures.

As described below in detail, after application of the windowing functions to the block of audio samples, frequency components of the windowed audio blocks are generated by transforming the windowed audio blocks from the time domain to the frequency domain using, for example, a discrete Fourier transformation (DFT) or any other suitable transform (e.g., discrete cosine transform (DCT), modified discrete cosine transform (MDCT), Haar transform, Walsh transform, etc.), be it based on a Fourier Transform or not. The transform can be used to analyze the frequency components in the windowed audio blocks and identify the spectral power of each frequency component. The spectral powers may then be used to generate digital signatures.

Other techniques may be used after application of the window functions to the audio blocks. For example, the windowed audio blocks may be processed using wavelet transforms that transform audio data from the time domain to the wavelet domain. In general, wavelet transforms may be used to decompose blocks or frames of data (e.g., time domain audio samples) into multiple sub-bands, thereby allowing data sets to be analyzed at various scales and/or resolutions. By separating data into multiple sub-bands, a wavelet transform may be used to analyze each time interval of data at a desired scale or resolution.

Alternatively, rather the applying window functions in the time domain to time domain blocks of audio samples, the windowing could be done in the frequency domain, wherein a frequency response corresponding to a time domain window may be convolved with the frequency spectrum of an audio block. If frequency domain processing including a convolution is used, a conversion of the audio block to the frequency domain may be carried out using a Fourier transformation, wherein adjustments are made between audio blocks to account for discontinuity. Additionally, if the processing and application of the windows are done in the frequency domain, a time domain window having a frequency characteristic with a number of non-zero elements (e.g., 3-5 non-zero elements) may be selected.

Monitored signatures may be generated using the above techniques at a monitoring site based on audio streams associated with media information (e.g., a monitored audio stream) that is consumed by an audience or to which an audience is exposed. For example, a monitored signature may be generated based on the audio track of a television program or any other media presented at a monitoring site. The monitored signature may then be communicated to a central data collection facility for comparison to one or more reference signatures.

Reference signatures are generated at a reference site and/or a central data collection facility using the above techniques on audio streams associated with known media information. The known media information may include media that is broadcast within a region, media that is reproduced within a household, media that is received via the Internet, etc. Each reference signature is stored in a memory with media identification information such as, for example, a song title, a movie title, etc. When a monitored signature is received at the central data collection facility, the monitored signature is compared with one or more reference signatures until a match is found. This match information may then be used to identify the media information (e.g., monitored audio stream) from which the monitored signature was generated. For example, a look-up table or a database may be referenced to retrieve a media title, a program identity, an episode number, etc. that corresponds to the media information from which the monitored signature was generated.

In one example, the rates at which monitored signatures and reference signatures are generated may be different. For example, for processing and other concerns, a monitored signature may be 25% of the data rate of a reference signature. For example, a 48-bit reference signature may be generated every 0.032 seconds, which results in a reference data rate of 48 bits*31.25/seconds or 187.5 bytes/second. In such an arrangement, a 48-bit monitored signature may be generated every 0.128 seconds, which results in a monitored data rate of 48 bits*7.8125/seconds or 46.875 bytes/second. Of course, in an arrangement in which the data rates of the monitored and reference signatures differ, this difference must be accounted for when comparing monitored signatures with reference signatures. For example, if the monitoring rate is 25% of the reference rate, each consecutive monitored signature will correspond to every fourth reference signature.

Figure 1B:
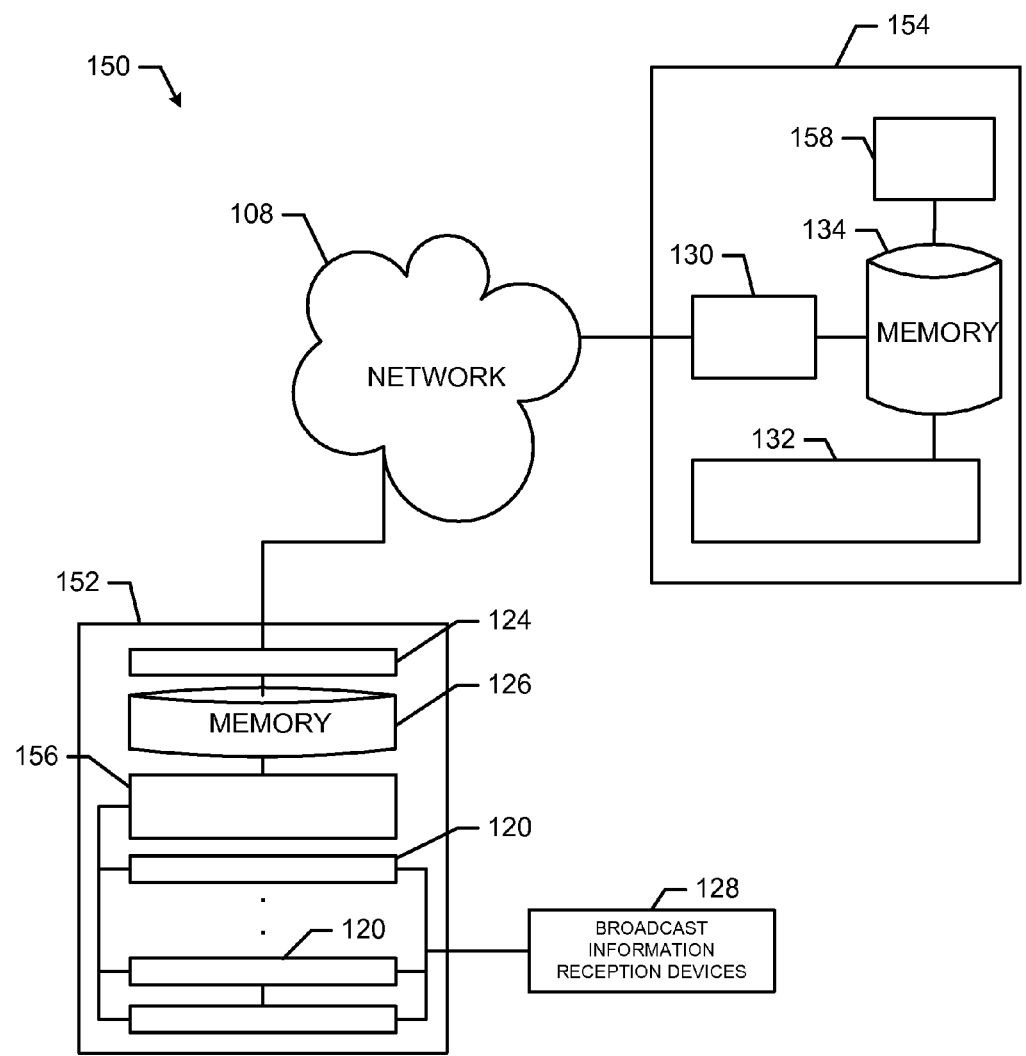

FIGS. 1A and 1B illustrate example audio stream identification systems 100 and 150 for generating digital spectral signatures and identifying audio streams. The example audio stream identification systems 100 and 150 may be implemented as a television broadcast information identification system and a radio broadcast information identification system, respectively. The example audio stream identification system 100 includes a monitoring site 102 (e.g., a monitored household), a reference site 104, and a central data collection facility 106.

Monitoring television broadcast information involves generating monitored signatures at the monitoring site 102 based on the audio data of television broadcast information and communicating the monitored signatures to the central data collection facility 106 via a network 108. Reference signatures may be generated at the reference site 104 and may also be communicated to the central data collection facility 106 via the network 108. The audio content represented by a monitored signature that is generated at the monitoring site 102 may be identified at the central data collection facility 106 by comparing the monitored signature to one or more reference signatures until a match is found. Alternatively, monitored signatures may be communicated from the monitoring site 102 to the reference site 104 and compared one or more reference signatures at the reference site 104. In another example, the reference signatures may be communicated to the monitoring site 102 and compared with the monitored signatures at the monitoring site 102.

The monitoring site 102 may be, for example, a household for which the media consumption of an audience is monitored. In general, the monitoring site 102 may include a plurality of media delivery devices 110, a plurality of media presentation devices 112, and a signature generator 114 that is used to generate monitored signatures associated with media presented at the monitoring site 102.

The plurality of media delivery devices 110 may include, for example, set top box tuners (e.g., cable tuners, satellite tuners, etc.), PVR devices, DVD players, CD players, radios, etc. Some or all of the media delivery devices 110 such as, for example, set top box tuners may be communicatively coupled to one or more broadcast information reception devices 116, which may include a cable, a satellite dish, an antenna, and/or any other suitable device for receiving broadcast information. The media delivery devices 110 may be configured to reproduce media information (e.g., audio information, video information, web pages, still images, etc.) based on, for example, broadcast information and/or stored information. Broadcast information may be obtained from the broadcast information reception devices 116 and stored information may be obtained from any information storage medium (e.g., a DVD, a CD, a tape, etc.). The media delivery devices 110 are communicatively coupled to the media presentation devices 112 and configurable to communicate media information to the media presentation devices 112 for presentation. The media presentation devices 112 may include televisions having a display device and/or a set of speakers by which audience members consume, for example, broadcast television information, music, movies, etc.

The signature generator 114 may be used to generate monitored digital signatures based on audio information, as described in greater detail below. In particular, at the monitoring site 102, the signature generator 114 may be configured to generate monitored signatures based on monitored audio streams that are reproduced by the media delivery devices 110 and/or presented by the media presentation devices 112. The signature generator 114 may be communicatively coupled to the media delivery devices 110 and/or the media presentation devices 112 via an audio monitoring interface 118. In this manner, the signature generator 114 may obtain audio streams associated with media information that is reproduced by the media delivery devices 110 and/or presented by the media presentation devices 112. Additionally or alternatively, the signature generator 114 may be communicatively coupled to microphones (not shown) that are placed in proximity to the media presentation devices 112 to detect audio streams. The signature generator 114 may also be communicatively coupled to the central data collection facility 106 via the network 108.

The network 108 may be used to communicate signatures (e.g., digital spectral signatures), control information, and/or configuration information between the monitoring site 102, the reference site 104, and the central data collection facility 106. Any wired or wireless communication system such as, for example, a broadband cable network, a DSL network, a cellular telephone network, a satellite network, and/or any other communication network may be used to implement the network 108.

As shown in FIG. 1A, the reference site 104 may include a plurality of broadcast information tuners 120, a reference signature generator 122, a transmitter 124, a database or memory 126, and broadcast information reception devices 128. The reference signature generator 122 and the transmitter 124 may be communicatively coupled to the memory 126 to store reference signatures therein and/or to retrieve stored reference signatures therefrom.

The broadcast information tuners 120 may be communicatively coupled to the broadcast information reception devices 128, which may include a cable, an antenna, a satellite dish, and/or any other suitable device for receiving broadcast information. Each of the broadcast information tuners 120 may be configured to tune to a particular broadcast channel. In general, the number of tuners at the reference site 104 is equal to the number of channels available in a particular broadcast region. In this manner, reference signatures may be generated for all of the media information transmitted over all of the channels in a broadcast region. The audio portion of the tuned media information may be communicated from the broadcast information tuners 120 to the reference signature generator 122.

The reference signature generator 122 may be configured to obtain the audio portion of all of the media information that is available in a particular broadcast region. The reference signature generator 122 may then generate a plurality of reference signatures (using, for example, the processing described in greater detail below) based on the audio information and store the reference signatures in the memory 126. Although one reference signature generator is shown in FIG. 1, a plurality of reference signature generators may be used in the reference site 104. For example, each of the plurality of signature generators may be communicatively coupled to a respective one of the broadcast information tuners 120.

The transmitter 124 may be communicatively coupled to the memory 126 and configured to retrieve signatures therefrom and communicate the reference signatures to the central data collection facility 106 via the network 108.

The central data collection facility 106 may be configured to compare monitored signatures received from the monitoring site 102 to reference signatures received from the reference site 104. In addition, the central data collection facility 106 may be configured to identify monitored audio streams by matching monitored signatures to reference signatures and using the matching information to retrieve television program identification information (e.g., program title, broadcast time, broadcast channel, etc.) from a database. The central data collection facility 106 includes a receiver 130, a signature analyzer 132, and a memory 134, all of which are communicatively coupled as shown.

The receiver 130 may be configured to receive monitored signatures and reference signatures via the network 108. The receiver 130 is communicatively coupled to the memory 134 and configured to store the monitored signatures and the reference signatures therein.

The signature analyzer 132 may be used to compare reference signatures to monitored signatures. The signature analyzer 132 is communicatively coupled to the memory 134 and configured to retrieve the monitored signatures and the reference signatures from the same. The signature analyzer 132 may be configured to retrieve reference signatures and monitored signatures from the memory 134 and compare the monitored signatures to the reference signatures until a match is found. The memory 134 may be implemented using any machine accessible information storage medium such as, for example, one or more hard drives, one or more optical storage devices, etc.

Although the signature analyzer 132 is located at the central data collection facility 106 in FIG. 1A, the signature analyzer 132 may instead be located at the reference site 104. In such a configuration, the monitored signatures may be communicated from the monitoring site 102 to the reference site 104 via the network 108. Alternatively, the memory 134 may be located at the monitoring site 102 and reference signatures may be added periodically to the memory 134 via the network 108 by transmitter 124. Additionally, although the signature analyzer 132 is shown as a separate device from the signature generators 114 and 122, the signature analyzer 132 may be integral with the reference signature generator 122 and/or the signature generator 114. Still further, although FIG. 1 depicts a single monitoring site (i.e., the monitoring site 102) and a single reference site (i.e., the reference site 104), multiple such sites may be coupled via the network 108 to the central data collection facility 106.

The audio stream identification system 150 of FIG. 1B may be configured to monitor and identify audio streams associated with radio broadcast information, or any other media. In general, the audio stream identification system 150 is used to monitor the content that is broadcast by a plurality of radio stations in a particular broadcast region. Unlike the audio stream identification system 100 used to monitor television content consumed by an audience, the audio stream identification system 150 may be used to monitor music, songs, etc. that are broadcast within a broadcast region and the number of times that they are broadcast. This type of media tracking may be used to determine royalty payments, proper use of copyrights, etc. associated with each audio composition. The audio stream identification system 150 includes a monitoring site 152, a central data collection facility 154, and the network 108.

The monitoring site 152 is configured to receive all radio broadcast information that is available in a particular broadcast region and generate monitored signatures based on the radio broadcast information. The monitoring site 152 includes the plurality of broadcast information tuners 120, the transmitter 124, the memory 126, and the broadcast information reception devices 128, all of which are described above in connection with FIG. 1A. In addition, the monitoring site 152 includes a signature generator 156. When used in the audio stream identification system 150, the broadcast information reception devices 128 are configured to receive radio broadcast information and the broadcast information tuners 120 are configured to tune to the radio broadcast stations. The number of broadcast information tuners 120 at the monitoring site 152 may be equal to the number of radio broadcasting stations in a particular broadcast region.

The signature generator 156 is configured to receive the tuned to audio information from each of the broadcast information tuners 120 and generate monitored signatures for the same. Although one signature generator is shown (i.e., the signature generator 156), the monitoring site 152 may include multiple signature generators, each of which may be communicatively coupled to one of the broadcast information tuners 120. The signature generator 156 may store the monitored signatures in the memory 126. The transmitter 124 may retrieve the monitored signatures from the memory 126 and communicate them to the central data collection facility 154 via the network 108.

The central data collection facility 154 is configured to receive monitored signatures from the monitoring site 152, generate reference signatures based on reference audio streams, and compare the monitored signatures to the reference signatures. The central data collection facility 154 includes the receiver 130, the signature analyzer 132, and the memory 134, all of which are described in greater detail above in connection with FIG. 1A. In addition, the central data collection facility 154 includes a reference signature generator 158.

The reference signature generator 158 is configured to generate reference signatures based on reference audio streams. The reference audio streams may be stored on any type of machine accessible medium such as, for example, a CD, a DVD, a digital audio tape (DAT), etc. In general, artists and/or record producing companies send their audio works (i.e., music, songs, etc.) to the central data collection facility 154 to be added to a reference library. The reference signature generator 158 may read the audio data from the machine accessible medium and generate a plurality of reference signatures based on each audio work (e.g., the captured audio 300 of FIG. 3). The reference signature generator 158 may then store the reference signatures in the memory 134 for subsequent retrieval by the signature analyzer 132. Identification information (e.g., song title, artist name, track number, etc.) associated with each reference audio stream may be stored in a database and may be indexed based on the reference signatures. In this manner, the central data collection facility 154 includes a database of reference signatures and identification information corresponding to all known and available song titles.

The receiver 130 is configured to receive monitored signatures from the network 108 and store the monitored signatures in the memory 134. The monitored signatures and the reference signatures are retrieved from the memory 134 by the signature analyzer 132 for use in identifying the monitored audio streams broadcast within a broadcast region. The signature analyzer 132 may identify the monitored audio streams by first matching a monitored signature to a reference signature. The match information and/or the matching reference signature are then used to retrieve identification information (e.g., a song title, a song track, an artist, etc.) from a database stored in the memory 134.

Although one monitoring site (e.g., the monitoring site 152) is shown in FIG. 1B, multiple monitoring sites may be communicatively coupled to the network 108 and configured to generate monitored signatures. In particular, each monitoring site may be located in a respective broadcast region and configured to monitor the content of the broadcast stations within a respective broadcast region.

Figure 2:
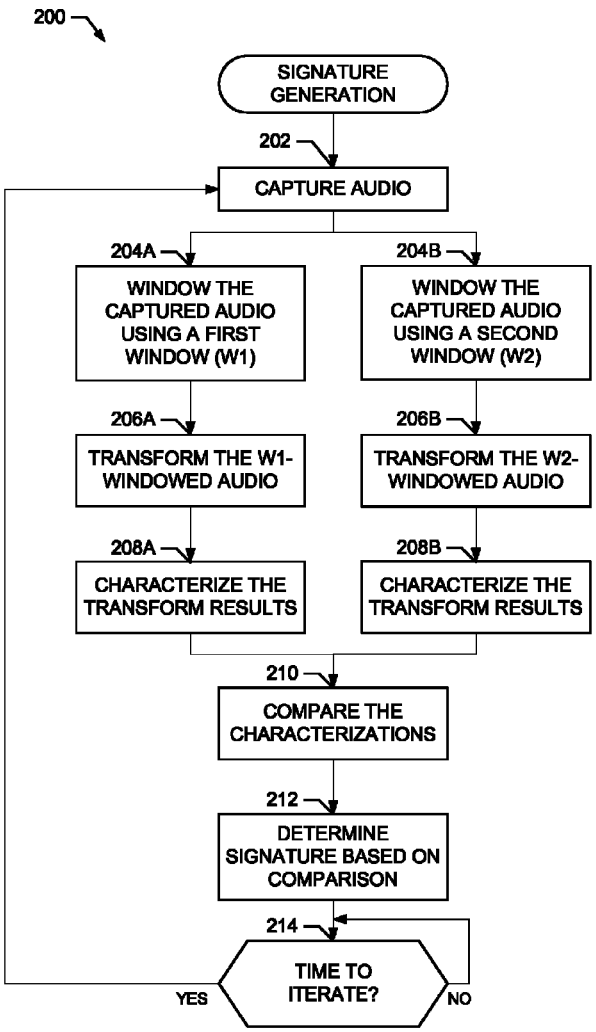
FIG. 2 is a flow diagram illustrating an example signature generation process.
Figure 3:
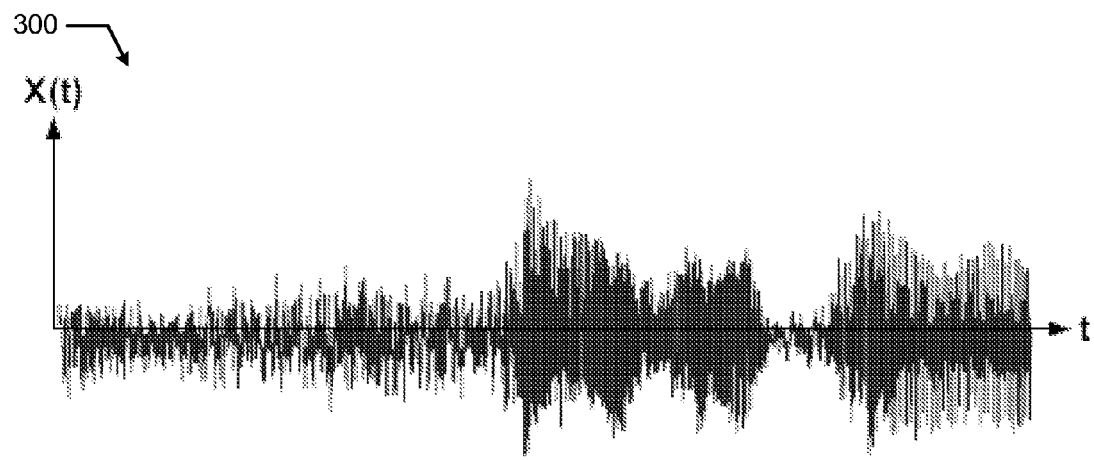
FIG. 3 is a time-domain representation of an example monitored audio stream.

FIG. 2 is a flow diagram representing an example signature generation process 200. As shown in FIG. 2, the signature generation process 200 first captures a block of audio that is to be characterized by a signature (block 202). An example time domain plot of audio that may be captured is shown in FIG. 3 at reference numeral 300. The audio may be captured from an audio source via, for example, a hardwired connection to an audio source or via a wireless connection, such as an audio sensor, to an audio source. If the audio source is analog, the capturing includes sampling the analog audio source using, for example, an analog-to-digital converter. In one example, the audio source may be sampled at a rate of 8 kilohertz (kHz), which is referred to as a sampling rate ($F_s$). This means that the analog audio is represented by digital samples thereof that are taken at the rate of eight thousand samples per second, or every 125 microseconds (us). Each of the audio samples may be represented by monoaural, 16 bits of resolution.

Figure 4:
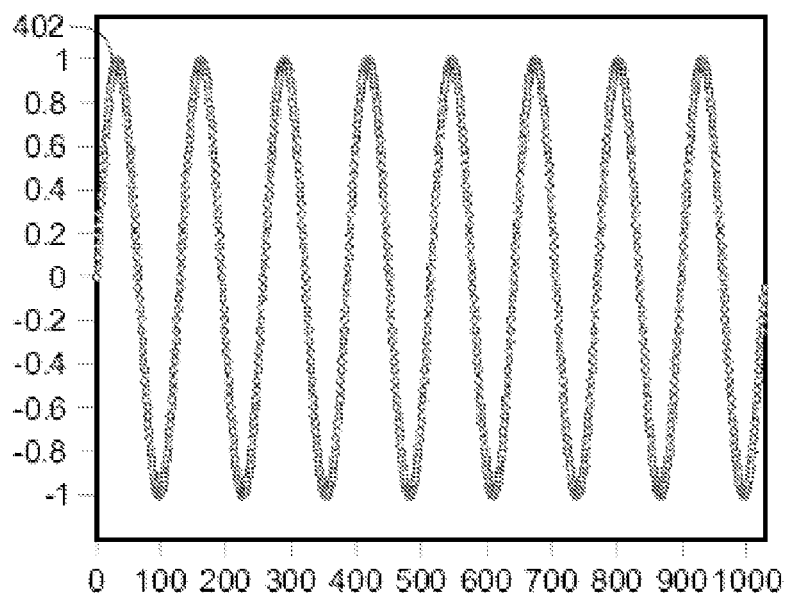
FIG. 4 is a plot of an example of a portion of the monitored audio stream (i.e., an audio block) that is a sinusoid.

In one example, an audio block corresponding to 8192 samples is captured for processing. At the foregoing sampling rate of 8 kHz, this corresponds to 1.024 seconds of audio. However, this is merely one example, and the number of samples that are collected may correspond to audio segments ranging anywhere from approximately 1 second to 2 seconds in duration. Generically, herein the number of captured samples in an audio block is referred to with the variable N. Thus, in the above example, N=8192 and the time range of audio captured corresponds to t . . . t+N/$F_s$. A representation of an audio block is shown in FIG. 4 at reference numeral 402, in which, for example purposes, the audio block corresponds to a sinusoid.

Figure 5:
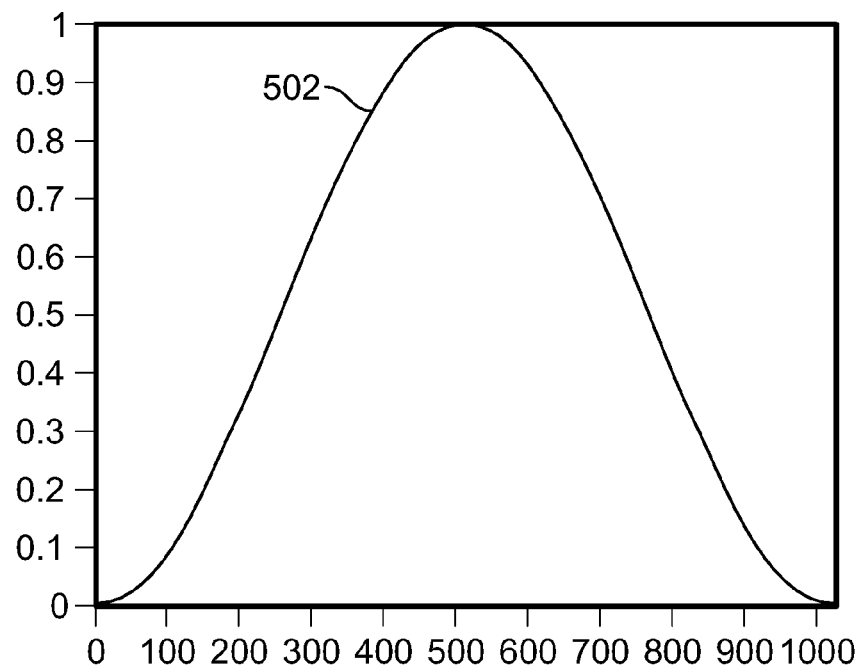
FIG. 5 is a plot of an example window that may be applied to the audio block of FIG. 4.
Figure 6:
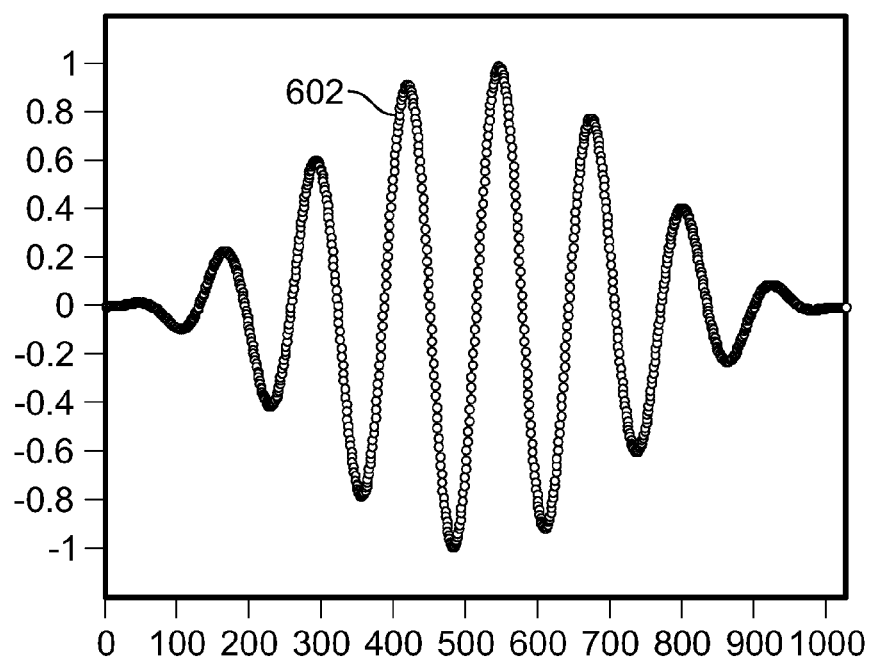
FIG. 6 is a plot of a windowed audio block resulting from an application of the window of FIG. 5 to the audio block of FIG. 4.

After the audio block has been captured (block 202), the process 200 applies the first window function, referred to as $W_1$ (block 204A), to the audio block to produce a first windowed audio block. Additionally, the process 200 windows the audio block using a second window function, referred to as $W_2$ (block 204B) to produce a second windowed audio block. For example, the window may be a Gaussian or bell shaped function such as that shown at reference numeral 502 in FIG. 5, wherein the high and low ends of $W_1$ 502 have a zero value and the center of the window 502 has a value of one. In one example, the windowing is a sample-wise multiplication between the values of window function and respective samples of the audio block. For example, windowing the audio block 402 with the window 502, results in a windowed audio block 602, as shown in FIG. 6, wherein the amplitude of the windowed audio block 602 is zero at the extremes of the window 502 and is the same amplitude as the audio block 402 at the center of the windowed audio block 602.

Alternatively, rather the applying window functions in the time domain using sample-wise multiplication of window functions to the audio block, the windowing could be done in the frequency domain, wherein a frequency response corresponding to a time domain window may be convolved with the frequency spectrum of an audio block. As noted above, if frequency domain processing including a convolution is used, a conversion of the audio block to the frequency domain may be carried out using a Fourier transformation, wherein adjustments are made between audio blocks to account for discontinuity. Additionally, if the processing and application of the windows are done in the frequency domain, a time domain window having a frequency characteristic with a number of non-zero elements (e.g., 3-5 non-zero elements) may be selected.

Figure 7:
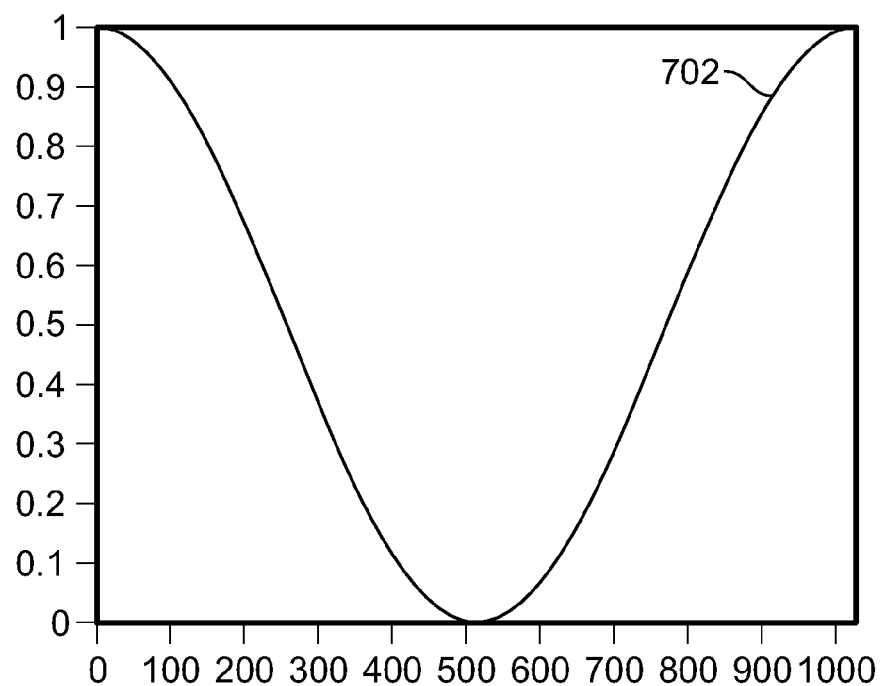
FIG. 7 is a plot of a second example window that may be applied to the audio block of FIG. 4.
Figure 8:
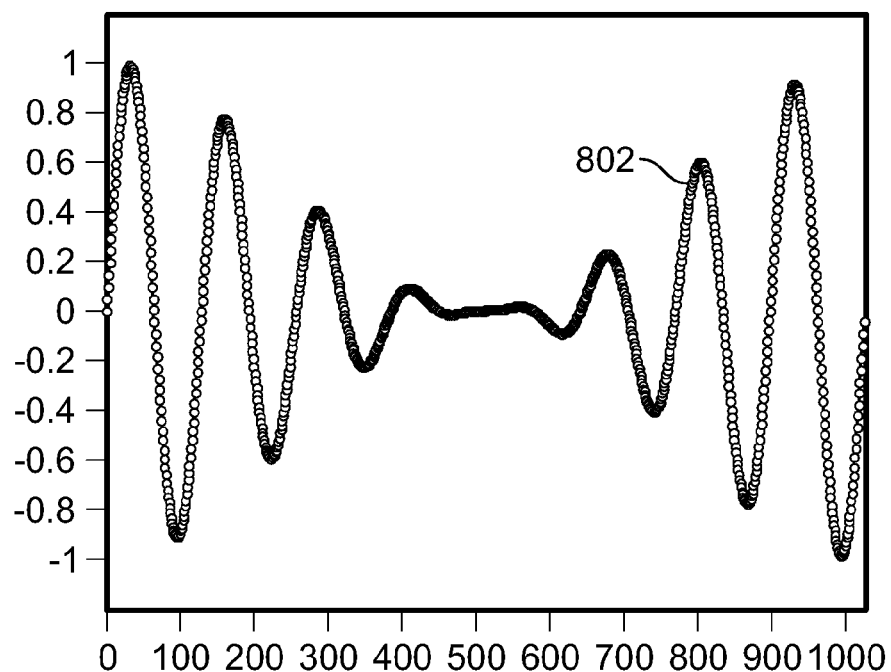
FIG. 8 is a plot of a windowed audio block resulting from an application of the window of FIG. 7 to the audio block of FIG. 4.

The windows selected for $W_1$ and $W_2$ may be complimentary in nature. For example, if the window 502 shown in FIG. 5 is selected for $W_1$, the window 702 of FIG. 7 may be selected for $W_2$. As shown in FIG. 7, the window 702 is an inverted version of the window $W_1$, namely $W_2(k)=1-W_1(k)$, where k is a sample index in the window domain. Window $W_2$ approaches unity value at the high and low ends of the window 702 and has a zero value in the center of the window 702. Thus, when the window 702 is applied to the audio block 402, a windowed audio block 802, as shown in FIG. 8, results. As shown in FIG. 8, the windowed audio block 802 has a zero amplitude in the center thereof, but has an amplitude that substantially matches the amplitude of the audio block 402 at the extremes of the windowed audio block 802.

Figure 9:
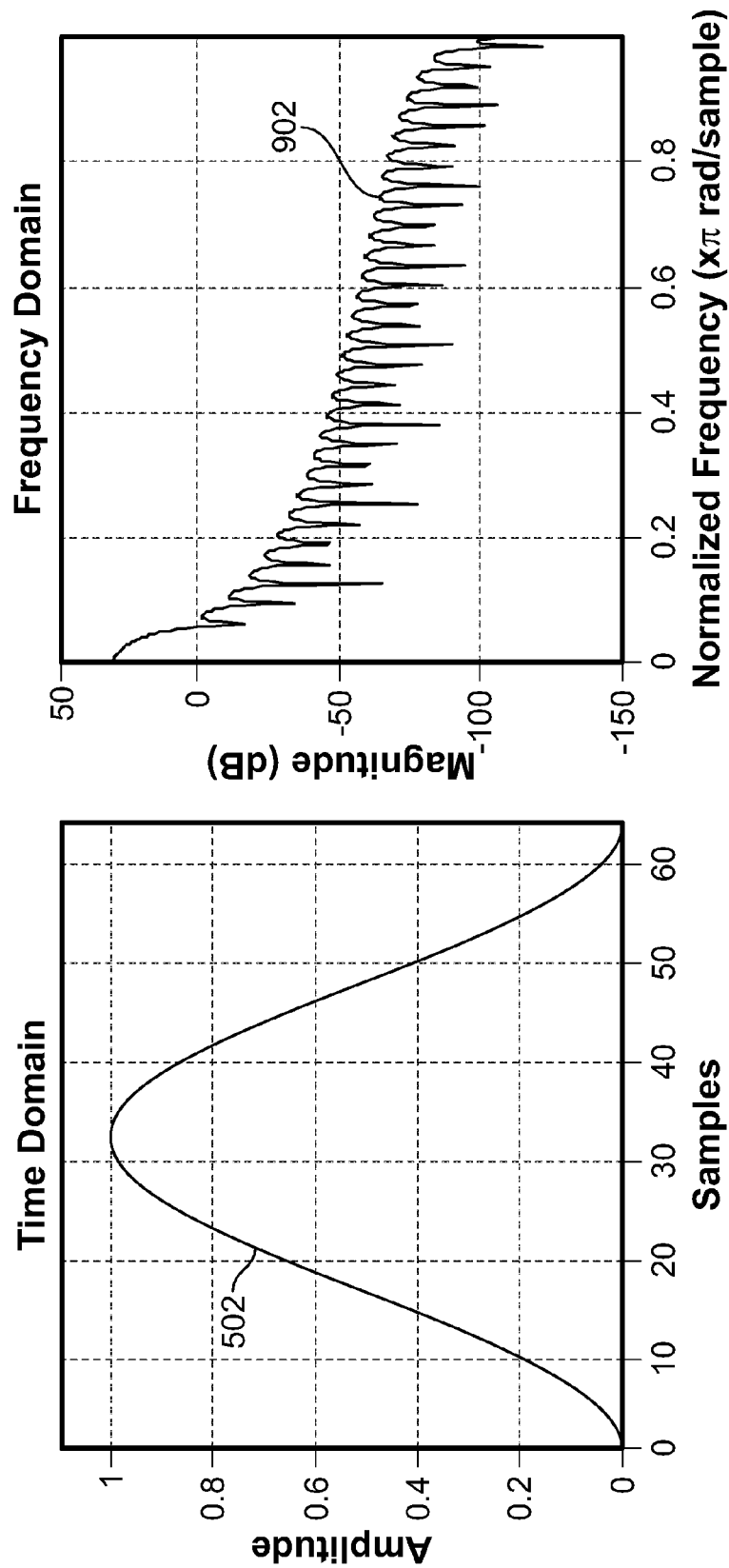
FIG. 9 is a plot of the window of FIG. 5 showing the corresponding frequency response of the window.
Figure 10:
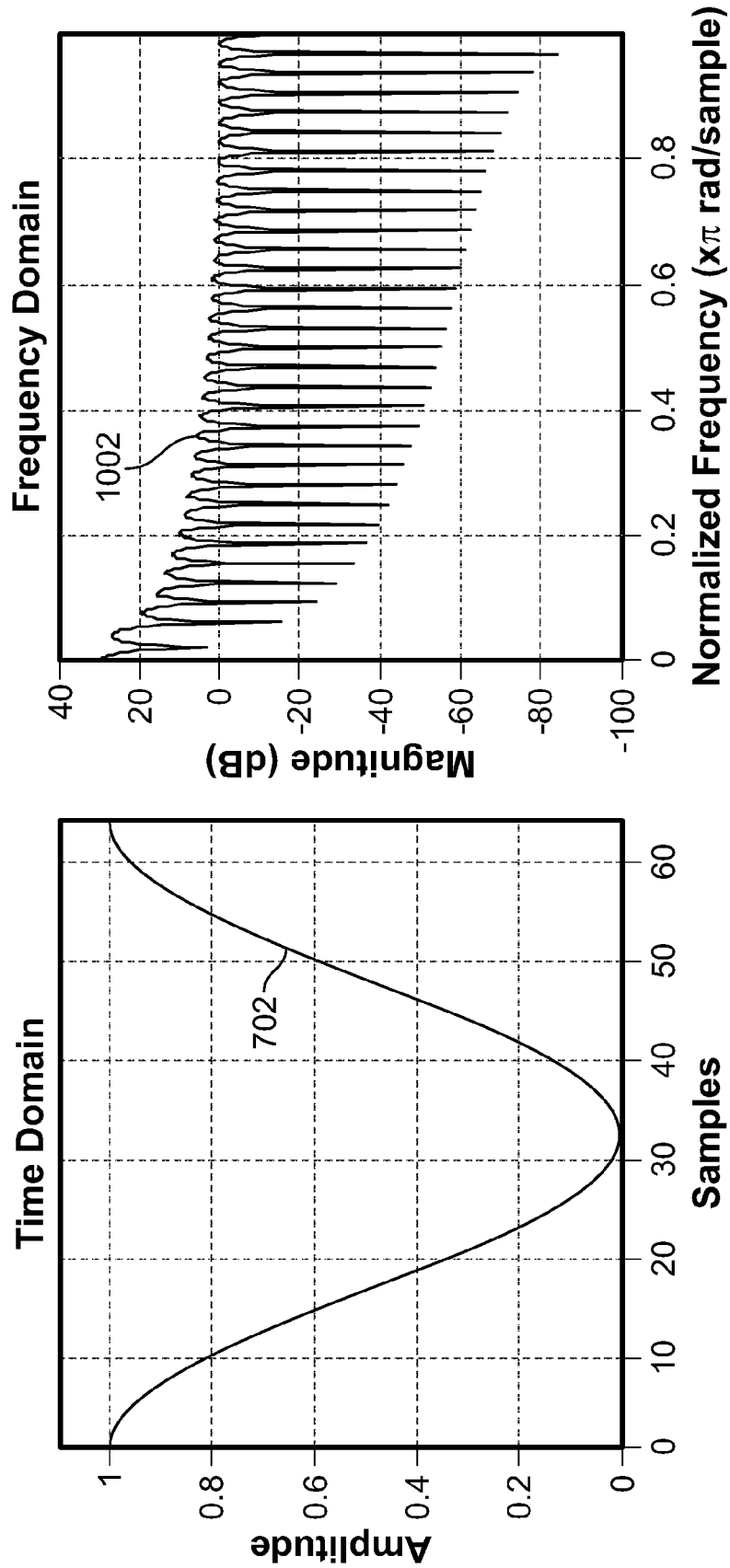
FIG. 10 is a plot of the window of FIG. 7 showing the corresponding frequency response of the window.

As shown in FIGS. 9 and 10, the windows 502 and 702 have respective frequency responses, 902 and 1002. Thus, the application of the windows 502 and 702 to the audio block (e.g., the audio block 402), affects the spectrum of the audio block. As explained below, it is the different effects of different windows on the audio block that are examined to determine signatures representative of the audio block.

Figure 11:
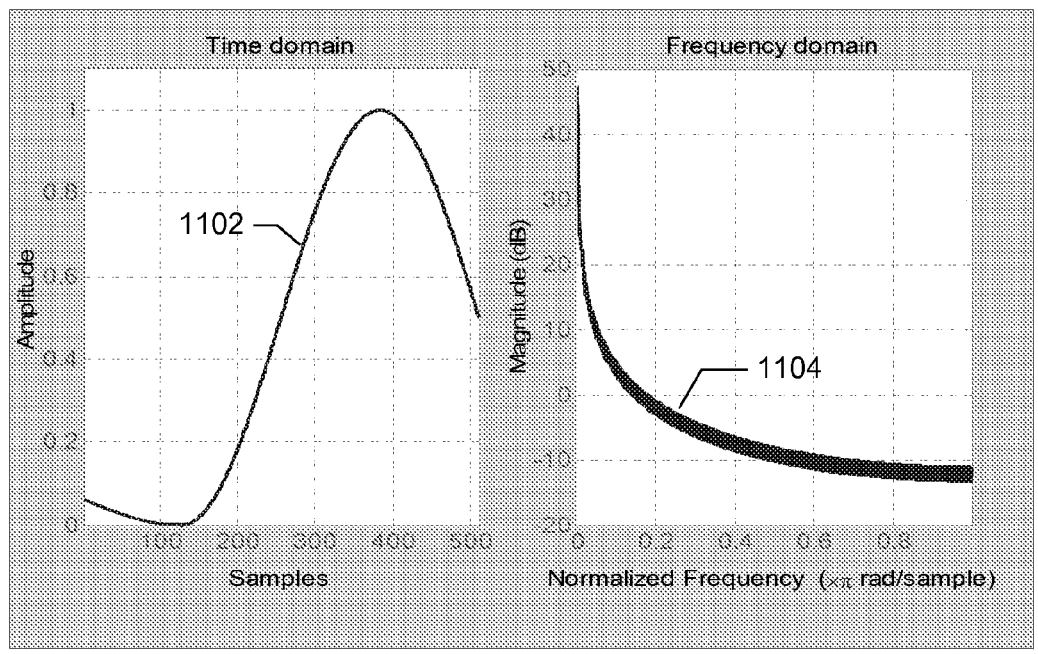
FIG. 11 is a plot of a second alternate example window and corresponding frequency response of the same.
Figure 12:
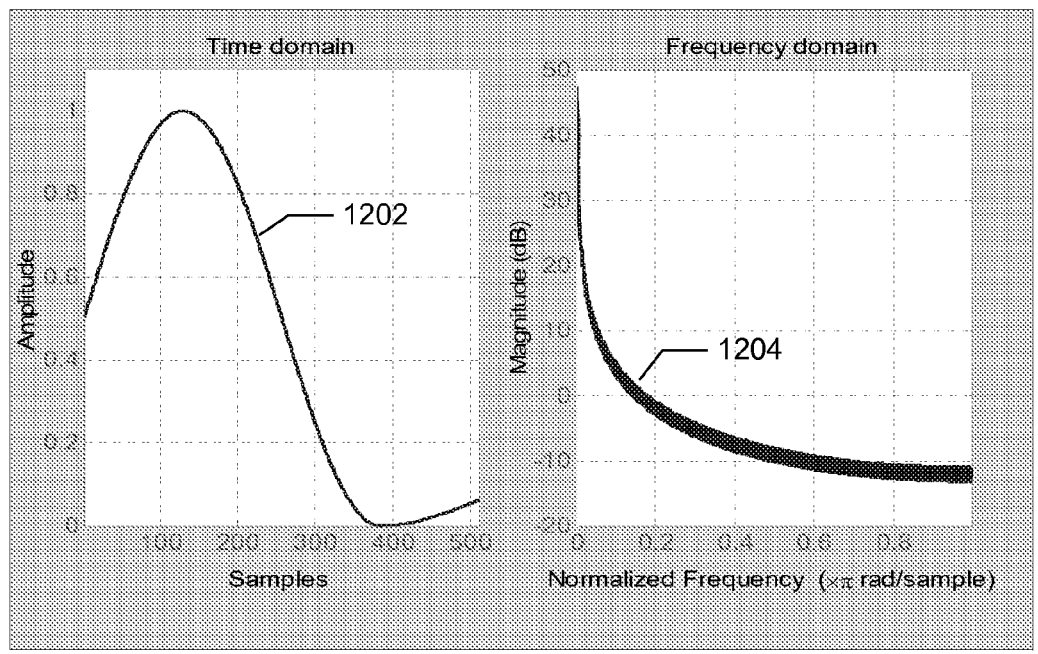
FIG. 12 is a plot of a third alternate example window and corresponding frequency response of the same.

While the windows 502, 702 selected for the description above resemble a Hann window and an inverted Hann window, respectively, other window shapes may be used. For example, as shown in FIGS. 11 and 12, two asymmetrical windows 1102, 1202 may be selected, wherein a first window 1102 occupies an upper half of the windowing space and wherein a second window 1202 occupies a lower half of the windowing space. The frequency responses of asymmetrical windows 1102, 1202 are identical as shown in FIGS. 11 and 12 at reference numerals 1104 and 1204, but because the windows operate on mostly distinct portions of an audio block, the results of the windowing have different spectral characteristics for audio signals that are not sinusoidal.

While certain examples of window shapes are described herein, other window shapes may be used. For example, window shapes may be arbitrarily selected for both the first window and the second window (e.g., $W_1$ and $W_2$), wherein the selection is made from a set of window functions. Of course, different windows may be used at different times, provided the monitor and reference sites use the same times. Additionally, more than two windows may be used.

Returning to FIG. 2, after the windowing is complete (blocks 204A and 204B), the windowed audio blocks are respectively transformed (blocks 206A and 206B). In one example, the transformation may be a transformation from the time domain into the frequency domain. For example, the N samples of captured audio that have been windowed may be converted into an audio spectrum that is represented by N/2 complex DFT coefficients. Alternatively, any suitable transformation, such as wavelet transforms, DCT, MDCT, Haar transforms, Walsh transforms, etc., may be used.

After the transformations are completed (block 206A and 206B), the process 200 characterizes the results of each transform (block 208A and 208B). For example, the process may determine the energy in each of K+1 different bands of each of the transformation results. That is, the results of the transformation on the windowed audio block resulting from the use of window $W_1$ (block 206A) may be divided into, for example, 16 different bands and the energy in each of the 16 different bands may be determined. This may be represented by $E_j(w1)$, wherein j ranges from 0 to 15, and w1 indicates that the energy is associated with the spectrum resulting from the application of window $W_1$ to the sampled audio (i.e., to the audio block). Similarly, the results of the transformation on the windowed block resulting from the use of window $W_2$ (block 206B) may be divided into, for example, 16 different bands, the energy of which may be determined and represented as $E_j(w2)$, wherein j ranges from 0 to 15, and w2 indicates that the energy is associated with the spectrum resulting from the application of window $W_2$. Alternatively, different spectral characteristics other than energy may be used to characterize the results. For example, spectral flatness of energy distribution may be used.

After each set of transform results has been characterized (blocks 208A and 208B), the process 210 compares the results of the characterizations. For example, the results of the characterizations of each band may be subtracted from one another. In one example, an intermediate value may be calculated as $d_j=E_j(w2)-E_j(w1)$, wherein j ranges from 0 to K. Keeping with the specific example above in which K=15, an intermediate value $d_j$ may be calculated, wherein $d_j=E_j(w2)-E_j(w1)$, and j ranges from 0 to 15. Thus, such a comparison results in 16 different intermediate values (e.g., $d_0, d_1, d_2 \ldots d_{15}$), wherein each intermediate value is the difference in characteristics in, for example, similar frequency bands of the spectra resulting from the transformations of the windowed audio blocks.

After the intermediate value has been calculated to represent the comparison of the characterizations (block 210), the process 200 determines signature bits based on the comparisons (block 212). For example, a signature bit $S_j$ may be assigned a value of 1 if the intermediate value $d_j>0$, and may be assigned a value of 0 otherwise, wherein j ranges from 0 to K. More specifically, as noted in the example above K=15 and, thus, there will be 16 comparisons of intermediate values to the value of 0 and, based on those comparisons, a 16 bit signature will be generated to represent the audio block, which was captured at block 202 of FIG. 2. After the signature has been determined (block 212), the process 200 iterates (block 214) and captures additional audio (block 202) to develop additional signatures.

While the foregoing describes the selection of a first window ($W_1$) and a second window ($W_2$) and that all signature bits for a block of captured audio are determined using the selected windows, other configurations are possible. For example, some bits of a signature representing the block of captured audio may be determined using a first pair of windows (e.g., $W_1$ and $W_2$), whereas other bits of the signature may be determined using a different pair of windows (e.g., $W_3$ and $W_4$). Additionally, a third pair of windows (e.g., $W_1$ and $W_3$) may be used to determine additional signature bits. In some cases, a unique pair of windows could be selected in a predetermined or arbitrary manner to determine the value of each signature bit, so long as those same window pairs were selected to operate on the same window blocks at the reference site.

Figure 13:
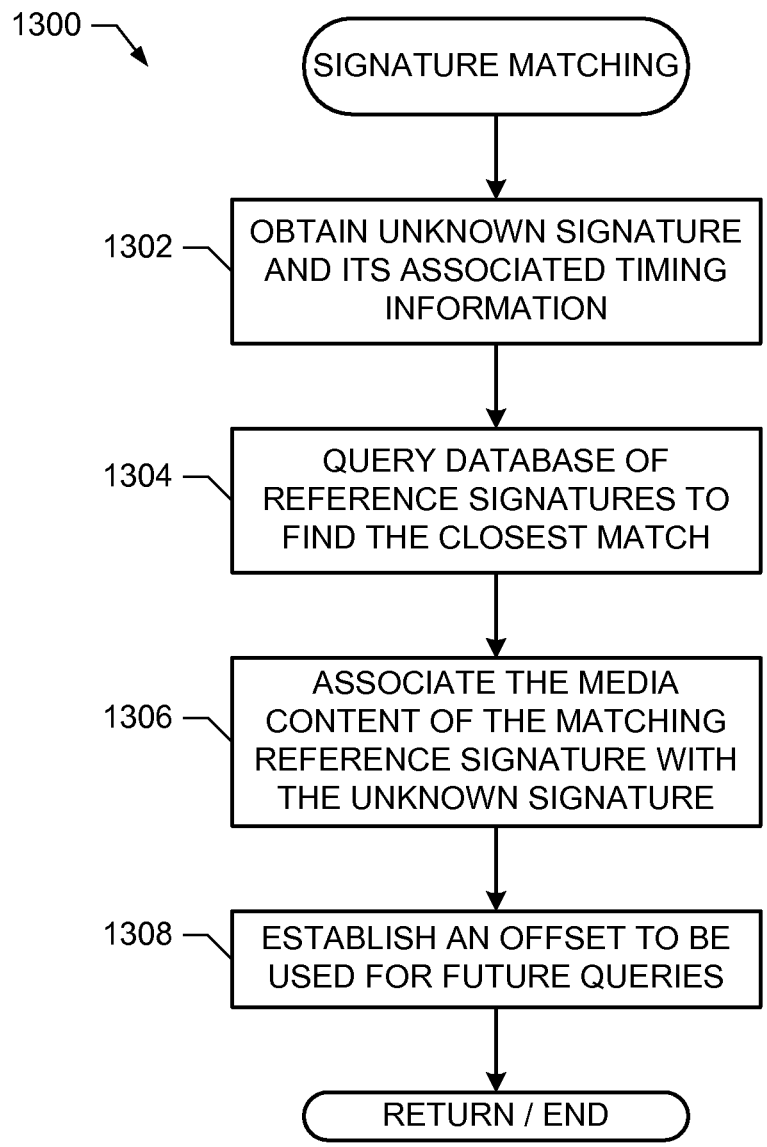
FIG. 13 is a flow diagram of an example signature matching process.

The foregoing has described signaturing techniques that may be carried out to determine signatures representative of a portion of captured audio. FIG. 13 shows one example signature matching process 1300 that may be carried out to compare reference signatures (i.e., signatures determined at a reference site(s)) to monitored signatures (i.e., signatures determined at a monitoring site). The ultimate goal of signature matching is to find the closest match between a query audio signature (e.g., monitored audio) and signatures in a database (e.g., signatures taken based on reference audio). The comparison may be carried out at a reference site, a monitoring site, or any other data processing site having access to the monitored signatures and a database containing reference signatures.

Figure 14:
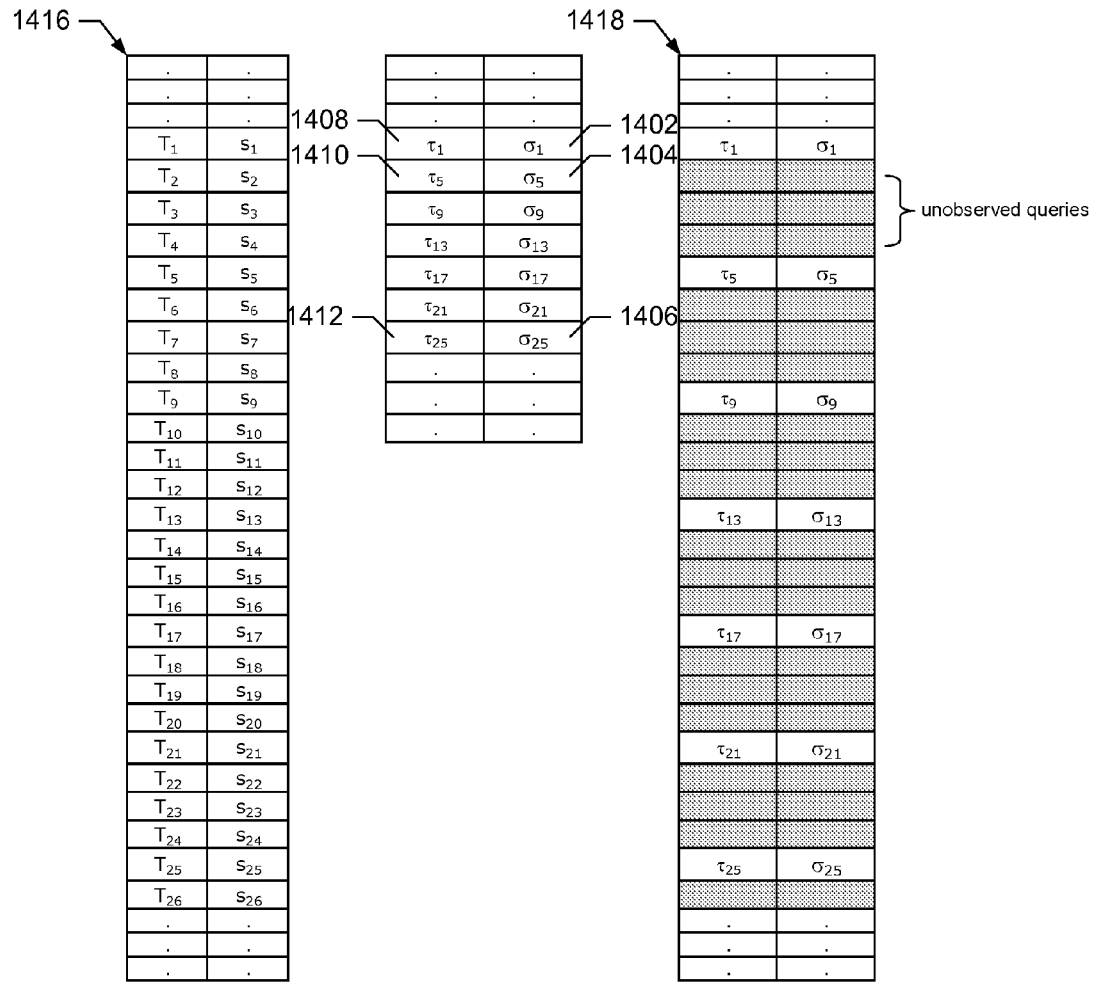
FIG. 14 is a diagram showing how signatures may be compared in accordance with the flow diagram of FIG. 13.

Now turning in detail to the example method of FIG. 13, the example process 1300 involves obtaining a monitored signature and its associated timing (block 1302). As shown in FIG. 14, a signature collection may include a number of monitored signatures, three of which are shown in FIG. 14 at reference numerals 1402, 1404 and 1406. Each of the signatures is represented by a sigma (σ). Each of the monitored signatures 1402, 1404, 1406 may include timing information 1408, 1410, 1412, whether that timing information is implicit or explicit.

A query is then made to a database containing reference signatures (block 1304) to identify the signature in the database having the closest match. In one implementation, the measure of similarity (closeness) between signatures is taken to be a Hamming distance, namely, the number of position at which the values of query and reference bit strings differ. In FIG. 14, a database of signatures and timing information is shown at reference numeral 1416. Of course, the database 1416 may include any number of different signatures from different media presentations. An association is then made between the program associated with the matching reference signature and the unknown signature (block 1306).

Optionally, the process 1300 may then establish an offset between the monitored signature and the reference signature (block 1308). The value of the offset is required in order to make a better, more confident, determination if a block of query signatures 1418 matches well the reference signature. Typically offset values for all signatures in short query block are remain almost constant relative to respective reference signatures due to continuity of monitoring (viewing).

In instances where all of the descriptors of more than one reference signature are associated with a Hamming distance below the predetermined Hamming distance threshold, more than one monitored signature may need to be matched with respective reference signatures of the possible matching reference audio streams. It will be relatively unlikely that all of the monitored signatures generated based on the monitored audio stream will match all of the reference signatures of more than one reference audio stream, and, thus erroneously matching more than one reference audio stream to the monitored audio stream can be prevented.

The example methods, processes, and/or techniques described above may be implemented by hardware, software, and/or any combination thereof. More specifically, the example methods may be executed in hardware defined by the block diagrams of FIGS. 15 and 16. The example methods, processes, and/or techniques may also be implemented by software executed on a processor system such as, for example, the processor system 1610 of FIG. 16.

Figure 15:
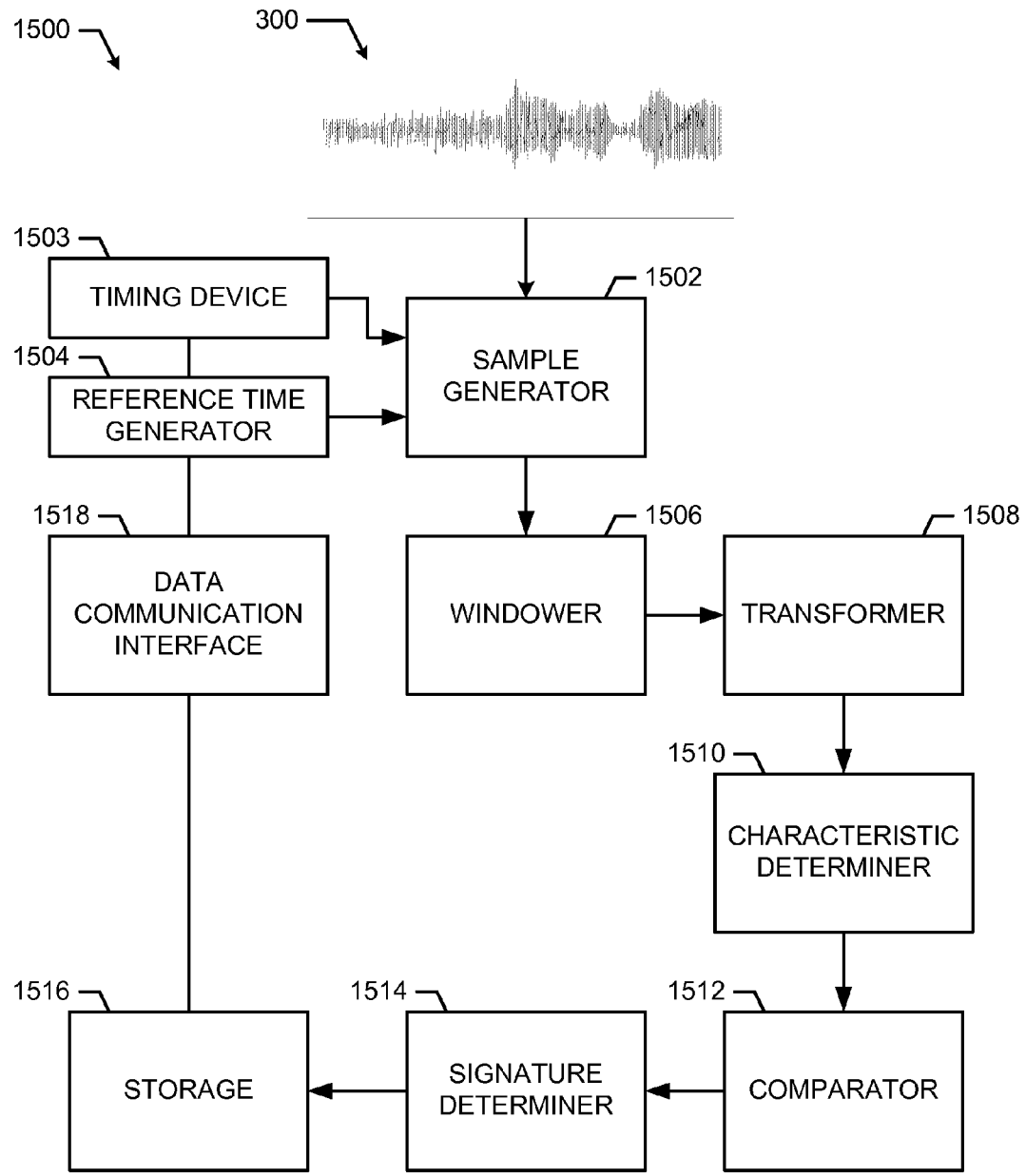
FIG. 15 is a block diagram of an example signature generation system for generating signatures based on audio streams or audio blocks.

FIG. 15 is a block diagram of an example signature generation system 1500 for generating digital spectral signatures. In particular, the example signature generation system 1500 may be used to generate monitored signatures and/or reference signatures based on windowing, transforming, characterizing, and comparing, an audio block, as described above. For example, the example signature generation system 1500 may be used to implement the signature generators 114 and 122 of FIG. 1A or the signature generators 156 and 158 of FIG. 1B. Additionally, the example signature generation system 1500 may be used to implement the example methods of FIG. 2.

As shown in FIG. 15, the example signature generation system 1500 includes a sample generator 1502, a timing device 1503, a reference time generator 1504, a windower 1506, a transformer 1508, a characteristic determiner 1510, a comparator 1512, a signature determiner 1514, storage 1516, and a data communication interface 1518, all of which may be communicatively coupled as shown. The example signature generation system 1500 may be configured to obtain an example audio stream, acquire a plurality of audio samples from the example audio stream to form a block of audio and from that single block of audio, generate a signature representative thereof.

The sample generator 1502 may be configured to obtain the example audio stream, such as a stream resulting in the captured audio 300 of FIG. 3. The stream 300 may be any analog or digital audio stream. If the example audio stream is an analog audio stream, the sample generator 1502 may be implemented using an analog-to-digital converter. If the example audio stream is a digital audio stream, the sample generator 1502 may be implemented using a digital signal processor. Additionally, the sample generator 1502 may be configured to acquire and/or extract audio samples at any desired sampling frequency $F_s$. For example, as described above, the sample generator may be configured to acquire N samples at 8 kHz and may use 16 bits to represent each sample. In such an arrangement, N may be any number of samples such as, for example, N=8192. The sample generator 1502 may also notify the reference time generator 1504 when an audio sample acquisition process begins. The sample generator 1502 communicates samples to the windower 1506.

The timing device 1503 may be configured to generate time data and/or timestamp information and may be implemented by a clock, a timer, a counter, and/or any other suitable device. The timing device 1503 may be communicatively coupled to the reference time generator 1504 and may be configured to communicate time data and/or timestamps to the reference time generator 1504. The timing device 1503 may also be communicatively coupled to the sample generator 1502 and may assert a start signal or interrupt to instruct the sample generator 1502 to begin collecting or acquiring audio sample data. In one example, the timing device 1503 may be implemented by a real-time clock having a 24-hour period that tracks time at a resolution of milliseconds. In this case, the timing device 1503 may be configured to reset to zero at midnight and track time in milliseconds with respect to midnight. However, generally timestamps can represent complete year, month, day, hour, minute, second information as a number of seconds elapsed from a predetermined moment in the past, such as 00:00 AM, Jan. 1, 2005. A subsecond resolution can be added by deriving from the deterministic aqusition rate of collected audio signatures The reference time generator 1504 may initialize a reference time to when a notification is received from the sample generator 1502. The reference time to may be used to indicate the time within an audio stream at which a signature is generated. In particular, the reference time generator 1504 may be configured to read time data and/or a timestamp value from the timing device 1503 when notified of the beginning of a sample acquisition process by the sample generator 1502. The reference time generator 1504 may then store the timestamp value as the reference time to.

The windower 1506 applies, for example, two windows to the audio block output from the sample generator 1502. Thus, the results of the windower 1506 are two windowed audio blocks. As described above, the windows may be any sets of windows. However, complimentary windows can be preferred because they would easily guarantee that on average the energy both values is the same, that leads to equi-probable bit distribution.

The transformer 1508 may be configured to perform an N point DFT on each of the windowed audio blocks, wherein N is the number of samples obtained by the sample generator 1502. For example, if the sample generator obtains 8192 samples, the transformer will produce a spectrum from the samples wherein the spectrum is represented by 4096 complex-valued Fourier coefficients.

The characteristic determiner 1510 may be configured to identify several frequency bands (e.g., 16 bands) within the DFT spectrum characterization generated by the transformer 1508. The selected bands may, but preferably do not, overlap with one another. The bands may be selected according to any technique. Of course, any number of suitable bands may be selected (e.g., 48). The characteristic determiner 1510 then determines a characteristic in each of the bands. For example, the characteristic determiner 1510 may determine the energy in each band. Thus, the results of the characteristic determiner 1510 are two sets of characteristics for each of, for example, 16 bands. For example, if 16 bands are selected, the characteristic determiner 1510 output would be 32 energy measures, one for each of the bands in each of the DFTs. The characteristics may be represented by $E_j(w1)$ and $E_j(w2)$, wherein j ranges from 0 to K (e.g., 0 to 15), and w1 and w2 represent window 1 and window 2, respectively.

The comparator 1512 compares the characteristics of respective bands to determine intermediate values. For example, the comparator 1512 may generate intermediate values according to $d_j = E_j(w2) - E_j(w1)$, such that energies in respective bands of the DFTs are subtracted from one another.

The signature determiner 1514 operates on the resulting values from the comparator 1512 to produce one signature bit for each of the intermediate values. This operation may be very similar or identical to the process 212 described above in conjunction with FIG. 2. That is, the signature bit values may be based a comparison of the intermediate value to zero. The signature bits are output to the storage 1516.

The storage may be any suitable medium for accommodating signature storage. For example, the storage 1516 may be a memory such as random access memory (RAM), flash memory, or the like. Additionally or alternatively, the storage 1516 may be a mass memory such as a hard drive, an optical storage medium, a tape drive, or the like.

The storage 1516 is coupled to the data communication interface 1518. For example, if the system 1500 is in a monitoring site (e.g., in a person's home) the signature information in the storage 1516 may be communicated to a collection facility, a reference site, or the like, using the data communication interface 1518.

Figure 16:
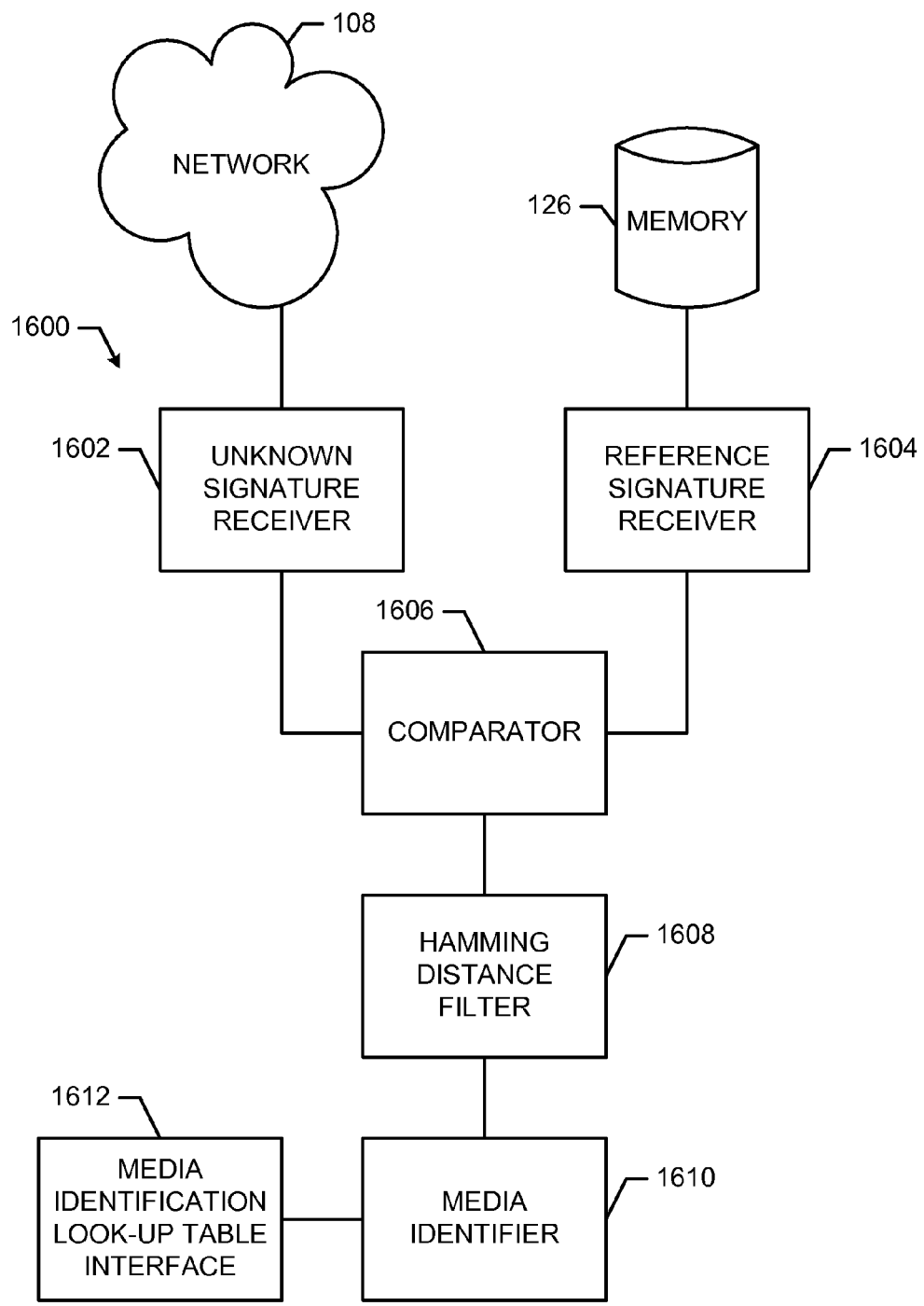
FIG. 16 is a block diagram of an example signature comparison system for comparing signatures.

FIG. 16 is a block diagram of an example signature comparison system 1600 for comparing digital spectral signatures. In particular, the example signature comparison system 1600 may be used to compare monitored signatures with reference signatures. For example, the example signature comparison system 1600 may be used to implement the signature analyzer 132 of FIG. 1A to compare monitored signatures with reference signatures. Additionally, the example signature comparison system 1600 may be used to implement the example process of FIG. 13.

The example signature comparison system 1600 includes a monitored signature receiver 1602, a reference signature receiver 1604, a comparator 1606, a Hamming distance filter 1608, a media identifier 1610, and a media identification look-up table interface 1612, all of which may be communicatively coupled as shown.

The monitored signature receiver 1602 may be configured to obtain monitored signatures via the network 108 (FIG. 1) and communicate the monitored signatures to the comparator 1606. The reference signature receiver 1604 may be configured to obtain reference signatures from the memory 134 (FIGS. 1A and 1B) and communicate the reference signatures to the comparator 1606.

The comparator 1606 and the Hamming distance filter 1608 may be configured to compare reference signatures to monitored signatures using Hamming distances. In particular, the comparator 1606 may be configured to compare descriptors of monitored signatures with descriptors from a plurality of reference signatures and to generate Hamming distance values for each comparison. The Hamming distance filter 1608 may then obtain the Hamming distance values from the comparator 1606 and filter out non-matching reference signatures based on the Hamming distance values.

After a matching reference signature is found, the media identifier 1610 may obtain the matching reference signature and in cooperation with the media identification look-up table interface 1612 may identify the media information associated with an unidentified audio stream (e.g., the example monitored audio stream 300 of FIG. 3). For example, the media identification look-up table interface 1612 may be communicatively coupled to a media identification look-up table or a database that is used to cross-reference media identification information (e.g., movie title, show title, song title, artist name, episode number, etc.) based on reference signatures. In this manner, the media identifier 1610 may retrieve media identification information from the media identification database based on the matching reference signatures.

Figure 17:
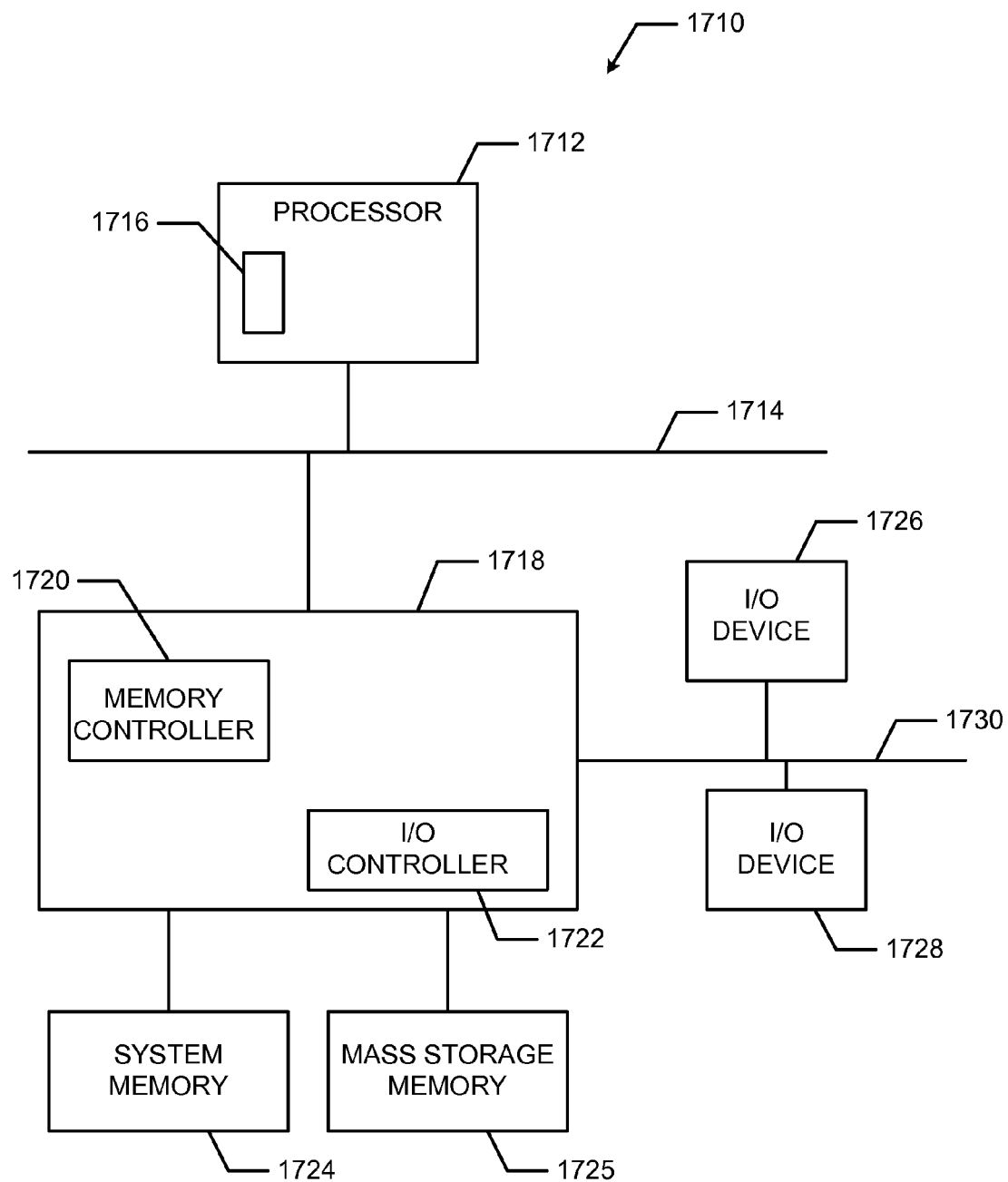
FIG. 17 is a block diagram of an example processor system that may be used to implement the methods and apparatus described herein.

FIG. 17 is a block diagram of an example processor system 1710 that may be used to implement the apparatus and methods described herein. As shown in FIG. 17, the processor system 1710 includes a processor 1712 that is coupled to an interconnection bus or network 1714. The processor 1712 includes a register set or register space 1716, which is depicted in FIG. 17 as being entirely on-chip, but which could alternatively be located entirely or partially off-chip and directly coupled to the processor 1712 via dedicated electrical connections and/or via the interconnection network or bus 1714. The processor 1712 may be any suitable processor, processing unit or microprocessor. Although not shown in FIG. 17, the system 1710 may be a multi-processor system and, thus, may include one or more additional processors that are identical or similar to the processor 1712 and that are communicatively coupled to the interconnection bus or network 1714.

The processor 1712 of FIG. 17 is coupled to a chipset 1718, which includes a memory controller 1720 and an input/output (I/O) controller 1722. As is well known, a chipset typically provides I/O and memory management functions as well as a plurality of general purpose and/or special purpose registers, timers, etc. that are accessible or used by one or more processors coupled to the chipset. The memory controller 1720 performs functions that enable the processor 1712 (or processors if there are multiple processors) to access a system memory 1724 and a mass storage memory 1725.

The system memory 1724 may include any desired type of volatile and/or non-volatile memory such as, for example, static random access memory (SRAM), dynamic random access memory (DRAM), flash memory, read-only memory (ROM), etc. The mass storage memory 1725 may include any desired type of mass storage device including hard disk drives, optical drives, tape storage devices, etc.

The I/O controller 1722 performs functions that enable the processor 1712 to communicate with peripheral input/output (I/O) devices 1726 and 1728 via an I/O bus 1730. The I/O devices 1726 and 1728 may be any desired type of I/O device such as, for example, a keyboard, a video display or monitor, a mouse, etc. While the memory controller 1720 and the I/O controller 1722 are depicted in FIG. 17 as separate functional blocks within the chipset 1718, the functions performed by these blocks may be integrated within a single semiconductor circuit or may be implemented using two or more separate integrated circuits.

The methods described herein may be implemented using instructions stored on a computer readable medium that are executed by the processor 1712. The computer readable medium may include any desired combination of solid state, magnetic and/or optical media implemented using any desired combination of mass storage devices (e.g., disk drive), removable storage devices (e.g., floppy disks, memory cards or sticks, etc.) and/or integrated memory devices (e.g., random access memory, flash memory, etc.).

Although certain methods, apparatus, and articles of manufacture have been described herein, the scope of coverage of this patent is not limited thereto.

What is claimed is:

1. A method of generating a signature representing a portion of an audio signal, the method comprising:
    capturing an audio signal;
    applying a first window function to a portion of the captured audio signal to produce a first windowed audio block;
    applying a second window function to the portion of the captured audio signal to produce a second windowed audio block;
    determining a first characteristic of a band of frequencies in the first windowed audio block;
    determining a second characteristic of the band of frequencies in the second windowed audio block;
    comparing the first characteristic to the second characteristic; and
    assigning a signature bit representative of the portion of the captured audio signal based on the comparison of the first characteristic and the second characteristic.

2. A method as defined in claim 1, wherein applying the first window function to the portion of the captured audio signal to produce the first windowed audio block and applying the second window function to the portion of the captured audio signal to produce the second windowed audio block comprises frequency domain processing to create first and second transformed windowed audio blocks.

3. A method as defined in claim 2, wherein determining the first and second characteristics of the band of frequencies in the first and second windowed audio blocks comprises processing the first and second transformed windowed audio blocks.

4. A method as defined in claim 1, wherein capturing the audio signal comprises wireless audio capture.

5. A method as defined in claim 4, wherein capturing the audio signal comprises digital sampling.

6. A method as defined in claim 1, wherein the first and second window functions comprise complimentary functions.

7. A method as defined in claim 6, wherein the first window function comprises a large magnitude at upper and lower ends of the first window function.

8. A method as defined in claim 7, wherein the second window function comprises a small magnitude at upper and lower ends of the second window function.

9. A method as defined in claim 6, wherein the first window function comprises a large magnitude at an upper end of the first window function and a small magnitude at a lower end of the first window function.

10. A method as defined in claim 9, wherein the second window function comprises a small magnitude at an upper end of the second window function and a large magnitude of a lower end of the second window function.

11. A method as defined in claim 1, wherein the first window function and the second window function are selected from a set of window functions.

12. A method as defined in claim 11, wherein the first window function and the second window function are arbitrarily selected from the set of window functions.

13. A method as defined in claim 1, wherein applying the first window function to the portion of the captured audio signal comprises multiplying the first window function and the portion of the captured audio signal in a time domain operation.

14. A method as defined in claim 13, wherein applying the second window function to the portion of the captured audio signal comprises multiplying the second window function and the portion of the captured audio signal in a time domain operation.

15. A method as defined in claim 1, wherein the first and second characteristics comprise first and second energies.

16. A method as defined in claim 15, wherein comparing the first and second characteristic comprises subtracting first and second energies.

17. A method as defined in claim 16, wherein assigning a signature bit comprises assigning a signature bit value based on a result of the subtraction of the first and second energies.

18. A method as defined in claim 15, further comprising determining additional characteristics in each of the first and second windowed audio blocks and using the additional characteristics to determine additional bits representative of the portion of the captured audio signal.

19. A method as defined in claim 1, further comprising:
    applying a third window function and a fourth window function to the portion of the captured audio to produce a third windowed audio block and a fourth windowed audio block; and
    processing the third windowed audio block and the fourth windowed audio block to determine additional bits representative of a the portion of the captured audio signal.

20. A method as defined in claim 19, wherein the processing includes comparing one or more of a third characteristic of the third windowed audio block, a fourth characteristic of the fourth windowed audio block, the first characteristic, or the second characteristic.

21. A computer readable medium storing computer readable instructions which, when executed, cause a computer to:
    capture an audio signal;
    apply a first window function to a portion of the captured audio signal to produce a first windowed audio block;
    apply a second window function to the portion of the captured audio signal to produce a second windowed audio block;

determine a first characteristic of a band of frequencies in the first windowed audio block;

determine a second characteristic of the band of frequencies in the second windowed audio block;

compare the first characteristic to the second characteristic; and assign a signature bit representative of the portion of the captured audio signal based on the comparison of the first characteristic and the second characteristic.

22. A computer readable medium as defined by claim 21, wherein applying the first window function to the portion of the captured audio signal to produce the first windowed audio block and applying the second window function to the portion of the captured audio signal to produce the second windowed audio block comprises frequency domain processing to create first and second transformed windowed audio blocks.

23. A computer readable medium as defined by claim 22, wherein determining the first and second characteristics of the band of frequencies in the first and second windowed audio blocks comprises processing the first and second transformed windowed audio blocks.

24. An apparatus to generate a signature representing a portion of an audio signal, the apparatus comprising:

a sample generator to capture an audio signal;

a windower to apply a first window function to a portion of the captured audio signal to produce a first windowed audio block and to apply a second window function to the portion of the captured audio signal to produce a second windowed audio block;

a characteristic determiner including a processor to determine a first characteristic of a band of frequencies in the first windowed audio block and to determine a second characteristic of the band of frequencies in the second windowed audio block;

a comparator to compare the first characteristic to the second characteristic; and a signature determiner to assign a signature bit representative of the portion of the captured audio signal based on the comparison of the first characteristic and the second characteristic.

25. An apparatus as defined in claim 24, wherein the windower applies the first window function to the portion of the captured audio signal to produce the first windowed audio block and applies the second window function to the portion of the captured audio signal to produce the second windowed audio block using frequency domain processing to create first and second transformed windowed audio blocks.

26. An apparatus as defined in claim 25, wherein the characteristic determiner determines the first and second characteristics of the band of frequencies in the first and second windowed audio blocks comprises by processing the first and second transformed windowed audio blocks.

27. An apparatus as defined in claim 24, wherein the first and second window functions comprise complimentary functions.

28. An apparatus as defined in claim 27, wherein the windower applies the first window function to the portion of the captured audio signal by multiplying the first window function and the portion of the captured audio signal in a time domain operation.

29. An apparatus as defined in claim 28, wherein the windower applies the second window function to the portion of the captured audio signal by multiplying the second window function and the portion of the captured audio signal in a time domain operation.

30. An apparatus as defined in claim 24, wherein the first and second characteristics comprise first and second energies.

* * * * *